US012155107B2

(12) United States Patent
Taguchi et al.

(10) Patent No.: US 12,155,107 B2
(45) Date of Patent: Nov. 26, 2024

(54) FILTER, ANTENNA MODULE, AND COMMUNICATION DEVICE

(71) Applicant: Murata Manufacturing Co., Ltd., Kyoto (JP)

(72) Inventors: Yoshinori Taguchi, Kyoto (JP); Toshiro Hiratsuka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 416 days.

(21) Appl. No.: 17/477,121

(22) Filed: Sep. 16, 2021

(65) Prior Publication Data

US 2022/0006168 A1 Jan. 6, 2022

Related U.S. Application Data

(63) Continuation of application No. PCT/JP2020/005236, filed on Feb. 12, 2020.

(30) Foreign Application Priority Data

Mar. 25, 2019 (JP) ................................ 2019-056306

(51) Int. Cl.
*H01P 1/203* (2006.01)
*H01P 7/08* (2006.01)

(52) U.S. Cl.
CPC ................ *H01P 1/203* (2013.01); *H01P 7/08* (2013.01)

(58) Field of Classification Search
CPC ............. H01P 1/203; H01P 7/08; H01P 7/086
See application file for complete search history.

(56) References Cited

U.S. PATENT DOCUMENTS

| | | | | |
|---|---|---|---|---|
| 4,701,727 | A | 10/1987 | Wong | |
| 2005/0088260 | A1* | 4/2005 | Ajioka ................ | H01Q 1/2283 257/E23.114 |
| 2006/0164188 | A1 | 7/2006 | Yamada | |

FOREIGN PATENT DOCUMENTS

| | | | | |
|---|---|---|---|---|
| CN | 106785259 | A | * | 5/2017 |
| JP | H11-205005 | A | | 7/1999 |
| JP | 2004-194296 | A | | 7/2004 |
| JP | 2005-086603 | A | | 3/2005 |

(Continued)

OTHER PUBLICATIONS

Tomohiro et al. (60GHz Monolithic LTCC Module for Wireless Communication Systems, European Conference on Wireless Technology, 2006, pp. 376-379, IEEE, Manchester, United Kingdom) (Year: 2006).*

(Continued)

*Primary Examiner* — Patrick C Chen
(74) *Attorney, Agent, or Firm* — Pearne & Gordon LLP

(57) ABSTRACT

A filter includes a multilayer substrate and resonators (8), (11), and (14) at three stages provided in the multilayer substrate and coupled to a next stage. The multilayer substrate is provided with a floating electrode for coupling an open end portion (9A2) of a linear conductor of the resonator (8) at an input stage and an open end portion (12B2) of a linear conductor of the resonator (11) at an output stage. The multilayer substrate is provided with a floating electrode for coupling an open end portion (9B2) of the linear conductor of the resonator (8) at the input stage and an open end portion (12A2) of the linear conductor of the resonator (11) at the output stage.

5 Claims, 20 Drawing Sheets

(56) References Cited

FOREIGN PATENT DOCUMENTS

| | | | |
|---|---|---|---|
| JP | 2006-166136 | A | 6/2006 |
| JP | 4042193 | B2 * | 2/2008 |

OTHER PUBLICATIONS

Hee Nam et al., "An Edge-Coupled Bandpass Filter with Sharp Skirt Characteristics Using Tapped-line Method", 2009, pp. 2538-2541, IEEE, Seoul, South Korea.
Tomohiro Seki et al., "60GHz Monolithic LTCC Module for Wireless Communication Systems", European Conference on Wireless Technology, 2006, pp. 376-379, IEEE, Manchester, United Kingdom.
International Search Report for International Patent Application No. PCT/JP2020/005236 dated May 12, 2020.
Written Opinion for International Patent Application No. PCT/JP2020/005236 dated May 12, 2020.

* cited by examiner

FILTER, ANTENNA MODULE, AND COMMUNICATION DEVICE

CROSS REFERENCE TO RELATED APPLICATIONS

This is a continuation of International Application No. PCT/JP2020/005236 filed on Feb. 12, 2020 which claims priority from Japanese Patent Application No. 2019-056306 filed on Mar. 25, 2019. The contents of these applications are incorporated herein by reference in their entireties.

BACKGROUND

Technical Field

The present disclosure relates to a filter, an antenna module, and a communication device suitable for use for high-frequency electromagnetic waves (high-frequency signals), such as microwaves and millimeter waves, for example.

A filter including resonators at three stages each formed of a linear conductor has been known (Non-Patent Document 1). In the filter described in Non-Patent Document 1, two adjacent resonators are coupled to each other.

Non-Patent Document 1: H. Nam, B. Jeon, T. Yun, H. Lee, Y. Kim, B. Jeon and J. Lee, “An Edge-Coupled Bandpass Filter with Sharp Skirt Characteristics Using Tapped-line Method”, 2009 Asia Pacific Microwave Conference, Singapore 7-10 Dec. 2009.

BRIEF SUMMARY

In the filter described in Non-Patent Document 1, it is necessary to change a distance between the resonators in order to adjust attenuation. However, in order to change the distance between the resonators, it is necessary to significantly change an arrangement and a shape of the resonator, and a coupling state of the adjacent resonators. Thus, there is a problem that a degree of freedom in design is low.

The present disclosure is to provide a filter, an antenna module, and a communication device with which a desired attenuation pole can be designed.

An embodiment of the present disclosure is a filter including a dielectric substrate, and resonators at least at three or more stages provided in the dielectric substrate, and coupled to a next stage. One of the resonators at an input stage is formed by a linear conductor having a C-shape in a plan view, and directly coupled to a transmission line on an input side provided in the dielectric substrate, one of the resonators at an output stage is formed by a linear conductor having a C-shape in a plan view, and directly coupled to a transmission line on an output side provided in the dielectric substrate, and the dielectric substrate is provided with a cross-coupling electrode for coupling an end portion of the linear conductor of the resonator at the input stage and an end portion of the linear conductor of the resonator at the output stage.

According to an embodiment of the present disclosure, desired attenuation can be obtained without necessarily complicating the shape of the resonator.

DESCRIPTION OF EMBODIMENTS

Hereinafter, a filter, an antenna module, and a communication device according to an embodiment of the present disclosure will be described in detail with reference to the accompanying drawings.

Figure 1:
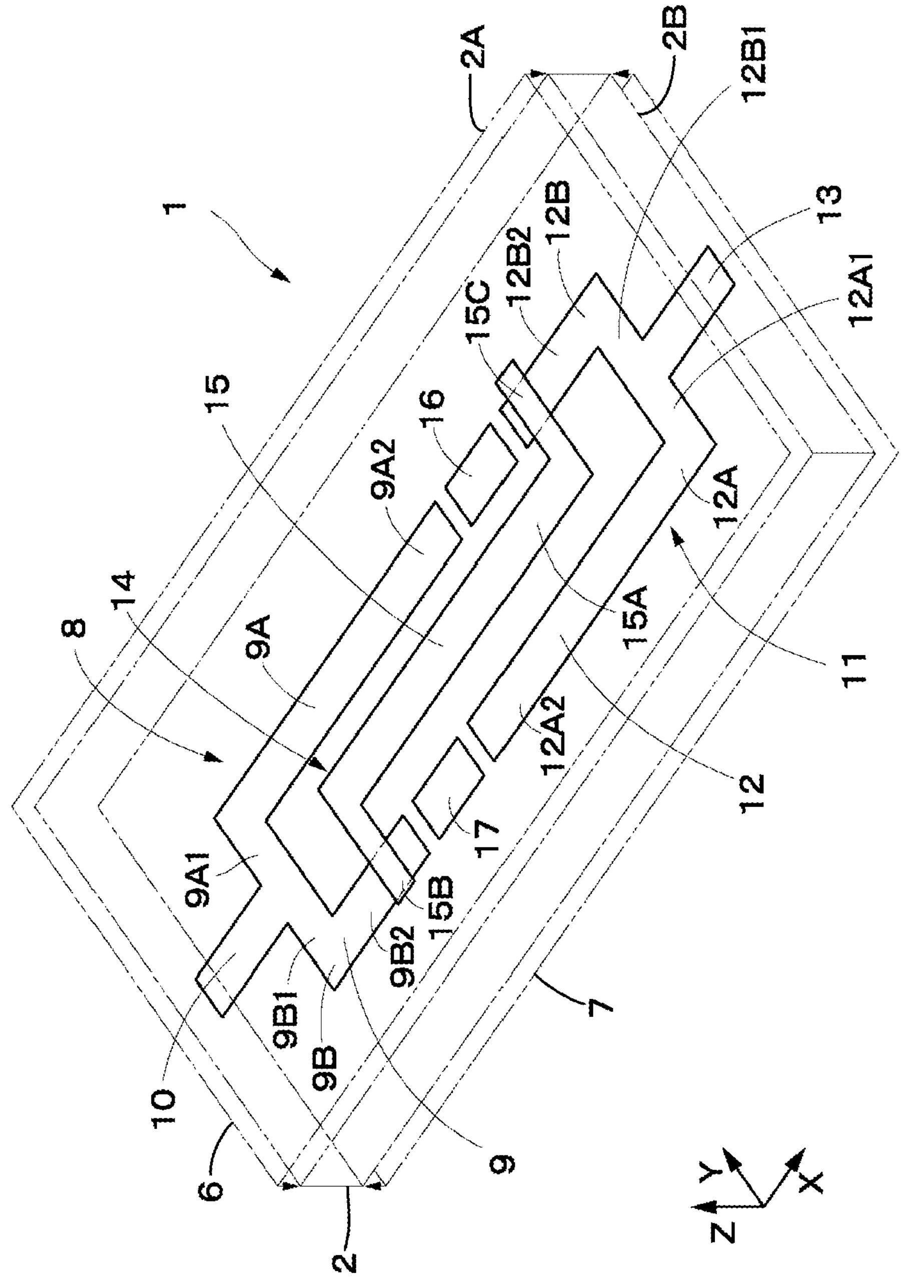
FIG. 1 is a perspective view illustrating a filter according to a first embodiment of the present disclosure.
Figure 4:
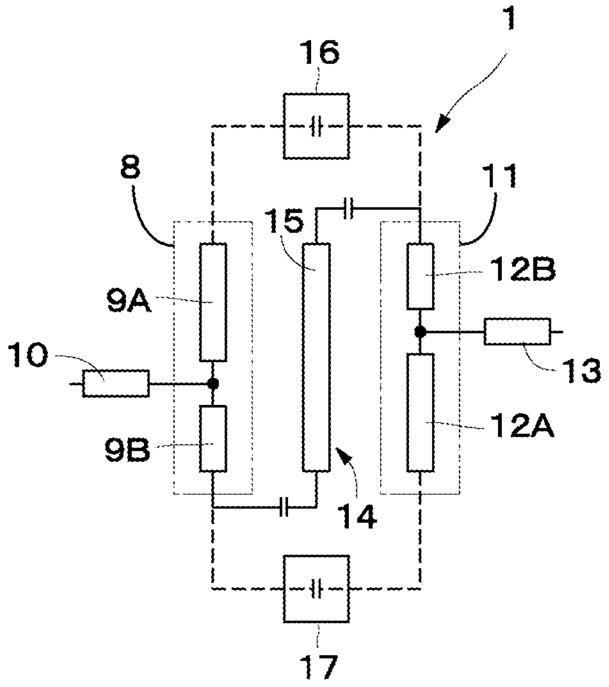
FIG. 4 is an equivalent circuit diagram illustrating the filter according to the first embodiment.

FIG. 1 and FIG. 4 illustrate a filter 1 according to a first embodiment of the present disclosure. The filter 1 includes a multilayer substrate 2, ground electrodes 6, 7, resonators 8, 11, 14, transmission lines 10, 13, floating electrodes 16, and 17. The filter 1 is a band pass filter that passes a signal in a band near a resonant frequency of the resonator 8, 11, and 14, and blocks signals in other bands.

The multilayer substrate 2 is a dielectric substrate. The multilayer substrate 2 is formed in a flat plate shape extending parallel to, among an X-axis direction, a Y-axis direction, and a Z-axis direction orthogonal to each other, for example, the X-axis direction and the Y-axis direction. The multilayer substrate 2 is formed by, for example, a low-temperature co-fired ceramics multilayer substrate (LTCC multilayer substrate). The multilayer substrate 2 has three layers of insulating layers 3 to 5 (see FIG. 3) laminated in the Z-axis direction from a first main surface 2A (front surface) toward a second main surface 2B (back surface). Each of the insulating layers 3 to 5 is made of an insulating ceramic material that can be fired at a low temperature of 1000° C. or lower, and is formed in a thin layer shape. Note that, the multilayer substrate 2 is not limited to the LTCC multilayer substrate, and may be a multilayer substrate in which insulating layers made of a resin material are laminated, for example. The multilayer substrate 2 may be a multilayer resin substrate formed by laminating a plurality of resin layers made of a liquid crystal polymer (LCP) having a lower dielectric constant. The multilayer substrate 2 may be a multilayer resin substrate formed by laminating a plurality of resin layers made of a fluorine-based resin. The multilayer substrate 2 may be a ceramic multilayer substrate other than the LTCC multilayer substrate. Further, the multilayer substrate 2 may be a flexible substrate having flexibility, or a rigid substrate having thermoplasticity.

The ground electrodes 6 and 7 are formed using a conductive metal material, such as copper or silver, for example. Note that, the ground electrodes 6 and 7 may be formed by a metal material containing aluminum, gold, or an alloy thereof as a main component. The ground electrode 6 is provided on the first main surface 2A of the multilayer substrate 2. The ground electrode 7 is provided on the second main surface 2B of the multilayer substrate 2. The ground electrodes 6 and 7 are connected to an external ground. The ground electrode 6 covers an entirety of the first main surface 2A of the multilayer substrate 2. The ground electrode 7 covers an entirety of the second main surface 2B of the multilayer substrate 2.

Figure 2:
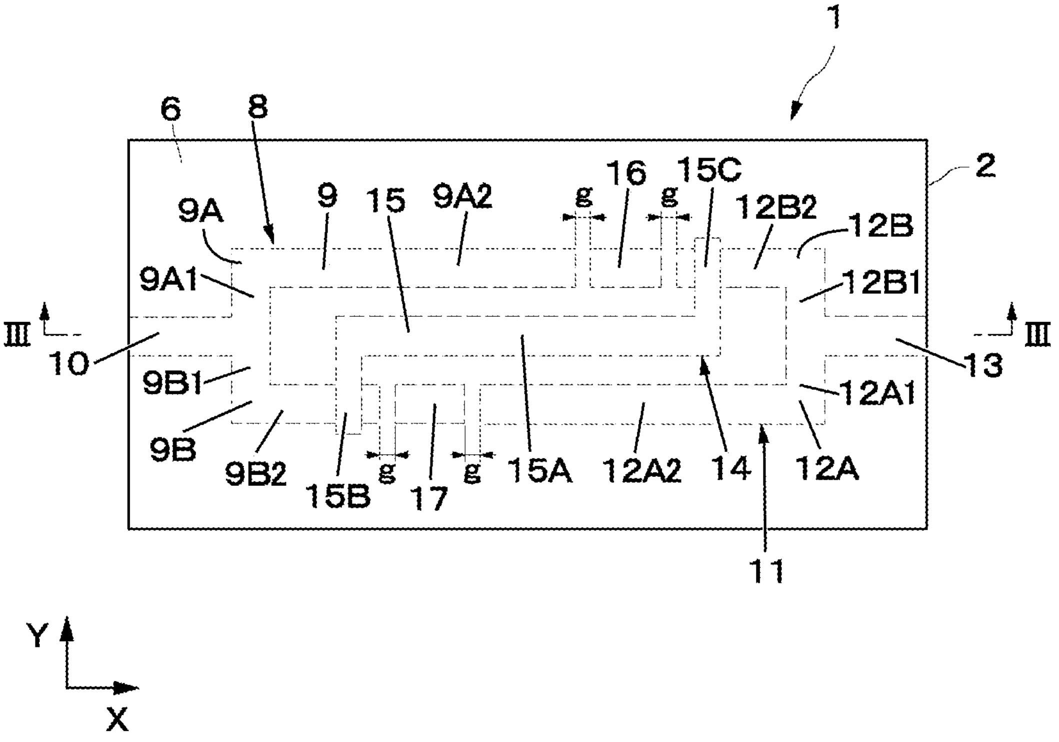
FIG. 2 is a plan view illustrating the filter in FIG. 1.
Figure 3:
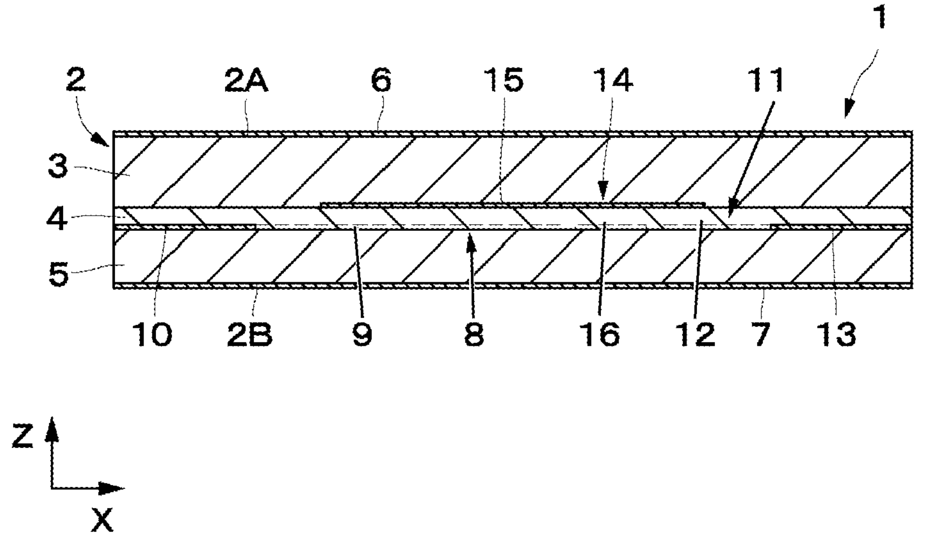
FIG. 3 is a cross-sectional view of the filter as viewed in a direction III-III indicated by arrows in FIG. 2.

The resonator 8 at an input stage is provided inside the multilayer substrate 2 (see FIG. 1 to FIG. 3). The resonator 8 is formed by a linear conductor 9 having a C shape in a plan view. As illustrated in FIG. 3, the linear conductor 9 is positioned between the insulating layer 4 and the insulating layer 5, and is formed by an elongated strip-shaped conductor pattern. A length dimension of the linear conductor 9 is set to, for example, ½ of a wave length in the multilayer substrate 2 corresponding to a resonant frequency. Both ends of the linear conductor 9 are open. Thus, the linear conductor 9 constitutes a half wave length resonator whose both the ends are open.

As illustrated in FIG. 1 and FIG. 2, the linear conductor 9 includes a first open portion 9A and a second open portion 9B. The first open portion 9A of the linear conductor 9 is formed in an L shape in a plan view. The first open portion 9A has a connecting portion 9A1 and an open end portion 9A2. The connecting portion 9A1 of the first open portion 9A is aligned with a connecting portion 9B1 of the second open portion 9B, and extends in the Y-axis direction. A first end of the connecting portion 9A1 is electrically connected to the connecting portion 9B1. A second end of the connecting portion 9A1 is electrically connected to a first end of the open end portion 9A2.

The open end portion 9A2 of the first open portion 9A is one end portion (edge end portion) of the linear conductor 9, and extends in the X-axis direction. A second end of the open end portion 9A2 is electrically open. A length dimension of the first open portion 9A is larger than half a length dimension of the linear conductor 9. Thus, the length dimension of the first open portion 9A is larger than a length dimension of the second open portion 9B. The first open portion 9A of the linear conductor 9 is a quarter-wave open stub.

The second open portion 9B of the linear conductor 9 is formed in an L shape in a plan view. The second open portion 9B has the connecting portion 9B1 and an open end portion 9B2. The connecting portion 9B1 of the second open portion 9B is aligned with the connecting portion 9A1 of the first open portion 9A, and extends in the Y-axis direction. A first end of the connecting portion 9B1 is electrically connected to the connecting portion 9A1. A second end of the connecting portion 9B1 is electrically connected to a first end of the open end portion 9B2. The open end portion 9B2 of the second open portion 9B is another end portion (edge end portion) of the linear conductor 9, and extends in the X-axis direction. A second end of the open end portion 9B2 is electrically open.

The transmission line 10 on an input side is electrically connected to an intermediate position of the linear conductor 9. To be more specific, the transmission line 10 is connected to the linear conductor 9 at a connecting position between the first open portion 9A and the second open portion 9B. The transmission line 10 is formed by a linear conductor. As illustrated in FIG. 3, the linear conductor of the transmission line 10 is positioned between the insulating layer 4 and the insulating layer 5, and extends in the X-axis direction. The transmission line 10 extends from the linear conductor 9 outside the multilayer substrate 2. The resonator 8 at the input stage is directly coupled to the transmission line 10 on the input side provided in the multilayer substrate 2. The direct coupling means that two conductor patterns, such as the linear conductor of the transmission line 10 and the linear conductor 9 of the resonator 8 are physically connected to each other.

The resonator 11 at an output stage is provided inside the multilayer substrate 2 (see FIG. 1 to FIG. 3). The resonator 11 is formed by a linear conductor 12 having a C shape in a plan view. As illustrated in FIG. 3, the linear conductor 12 is positioned between the insulating layer 4 and the insulating layer 5, and is formed by an elongated strip-shaped conductor pattern. A length dimension of the linear conductor 12 is set to, for example, ½ of a wave length in the multilayer substrate 2 corresponding to a resonant frequency. Both ends of the linear conductor 12 are open. Thus, the linear conductor 12 constitutes a half wave length resonator whose both the ends are open.

As illustrated in FIG. 1 and FIG. 2, the linear conductor 12 is spaced apart from the linear conductor 9 in the X-axis direction. The resonator 14 at an intermediate stage is disposed between the linear conductor 12 and the linear conductor 9. The linear conductor 12 is formed in a point-symmetric shape with the linear conductor 9 when the multilayer substrate 2 is viewed in a plan view. The linear conductor 12 includes a first open portion 12A and a second open portion 12B.

The first open portion 12A of the linear conductor 12 is formed in an L shape in a plan view. The first open portion 12A has a connecting portion 12A1 and an open end portion 12A2. The connecting portion 12A1 of the first open portion 12A is aligned with a connecting portion 12B1 of the second open portion 12B, and extends in the Y-axis direction. A first end of the connecting portion 12A1 is electrically connected to the connecting portion 12B1. A second end of the connecting portion 12A1 is electrically connected to a first end of the open end portion 12A2.

The open end portion 12A2 of the first open portion 12A is one end portion (edge end portion) of the linear conductor 12. The open end portion 12A2 of the first open portion 12A of the linear conductor 12 is aligned with the open end portion 9B2 of the second open portion 9B of the linear conductor 9, and extends in the X-axis direction. The open end portion 12A2 of the first open portion 12A of the linear conductor 12 is spaced apart from the open end portion 9B2 of the second open portion 9B of the linear conductor 9 in the X-axis direction. A second end of the open end portion 12A2 is electrically open. A length dimension of the first open portion 12A is larger than half a length dimension of the linear conductor 12. Thus, the length dimension of the first open portion 12A is larger than a length dimension of the second open portion 12B. The first open portion 12A of the linear conductor 12 is a quarter-wave open stub.

The second open portion 12B of the linear conductor 12 is formed in an L shape in a plan view. The second open portion 12B has the connecting portion 12B1 and an open end portion 12B2. The connecting portion 12B1 of the second open portion 12B is aligned with the connecting portion 12A1 of the first open portion 12A, and extends in the Y-axis direction. A first end of the connecting portion 12B1 is electrically connected to the connecting portion 12A1. A second end of the connecting portion 12B1 is electrically connected to a first end of the open end portion 12B2.

The open end portion 12B2 of the second open portion 12B is another end portion (edge end portion) of the linear conductor 12. The open end portion 12B2 of the second open portion 12B of the linear conductor 12 is aligned with the open end portion 9A2 of the first open portion 9A of the linear conductor 9, and extends in the X-axis direction. A second end of the open end portion 12B2 is electrically open.

The transmission line 13 on an output side is electrically connected to an intermediate position of the linear conductor 12. To be more specific, the transmission line 13 is connected to the linear conductor 12 at a connecting position between the first open portion 12A and the second open portion 12B. The transmission line 13 is formed by a linear conductor. As illustrated in FIG. 3, the linear conductor of the transmission line 13 is positioned between the insulating layer 4 and the insulating layer 5, and extends in the X-axis direction. The transmission line 13 extends from the linear conductor 12 outside the multilayer substrate 2. The resonator 11 at the output stage is directly coupled to the transmission line 13 on the output side provided in the multilayer substrate 2.

The resonator 14 at the intermediate stage is positioned between the resonator 8 at the input stage and the resonator 11 at the output stage, and is provided in the multilayer substrate 2. The resonator 14 is provided inside the multilayer substrate 2 (see FIG. 1 to FIG. 3). The resonator 14 is formed by a linear conductor 15 that is linear. As illustrated in FIG. 3, the linear conductor 15 is positioned between the insulating layer 3 and the insulating layer 4, and is formed by an elongated strip-shaped conductor pattern. Thus, the insulating layer 4 is sandwiched between the linear conductor 15, and the linear conductors 9 and 12. A length dimension of the linear conductor 15 is set to, for example, ½ of a wave length in the multilayer substrate 2 corresponding to a resonant frequency. Both ends of the linear conductor 15 are open. Thus, the linear conductor 15 constitutes a half wave length resonator whose both the ends are open.

As illustrated in FIG. 1 and FIG. 2, the linear conductor 15 includes a main body portion 15A and coupling portions 15B and 15C. The main body portion 15A is disposed at a position surrounded by the linear conductor 9 of the resonator 8 and the linear conductor 12 of the resonator 11 in a plan view. The main body portion 15A extends in the X-axis direction. A first end of the main body portion 15A is electrically connected to the coupling portion 15B. A second end of the main body portion 15A is electrically connected to the coupling portion 15C.

The coupling portion 15B is a first end portion of the linear conductor 15 and extends in the Y-axis direction from the first end of the main body portion 15A. The coupling portion 15B crosses the open end portion 9B2 of the second open portion 9B. The coupling portion 15B and the open end portion 9B2 are spaced apart from each other in the Z-axis direction. Accordingly, the coupling portion 15B of the linear conductor 15 is capacitively coupled to the open end portion 9B2 of the linear conductor 9.

The coupling portion 15C is a second end portion of the linear conductor 15, and extends in the Y-axis direction from the second end of the main body portion 15A. The coupling portion 15C crosses the open end portion 12B2 of the second open portion 12B. The coupling portion 15C and the open end portion 12B2 are spaced apart from each other in the Z-axis direction. Accordingly, the coupling portion 15C of the linear conductor 15 is capacitively coupled to the open end portion 12B2 of the linear conductor 12.

The floating electrode 16 is a cross-coupling electrode for cross-coupling the resonator 8 at the input stage and the resonator 11 at the output stage. The cross-coupling refers to a state in which resonators that are not directly adjacently coupled between an input stage and an output stage are electromagnetically coupled to each other. As illustrated in FIG. 1 and FIG. 2, the floating electrode 16 is positioned between the open end portion 9A2 of the linear conductor 9 and the open end portion 12B2 of the linear conductor 12, and is provided inside the multilayer substrate 2. The floating electrode 16 is aligned with the open end portion 9A2 and the open end portion 12B2. As illustrated in FIG. 3, the floating electrode 16 is positioned between the insulating layer 4 and the insulating layer 5, and is formed in an island shape. As illustrated in FIG. 2, a gap g in the X-axis direction is formed between the floating electrode 16 and the linear conductor 9 or 12. Accordingly, the floating electrode 16 is not in contact with the linear conductors 9 and 12, and is spaced apart from the linear conductors 9 and 12. The floating electrode 16 capacitively couples the open end portion 9A2 of the linear conductor 9 and the open end portion 12B2 of the linear conductor 12 in accordance with a size of the gap g.

The floating electrode 17 is a cross-coupling electrode for cross-coupling the resonator 8 at the input stage and the resonator 11 at the output stage. As illustrated in FIG. 1 and FIG. 2, the floating electrode 17 is positioned between the open end portion 9B2 of the linear conductor 9 and the open end portion 12A2 of the linear conductor 12, and is provided inside the multilayer substrate 2. The floating electrode 17 is aligned with the open end portion 9B2 and the open end portion 12A2. The floating electrode 17 is positioned in the same layer as the linear conductors 9, 12, and the floating electrode 16, and is formed in an island shape. As illustrated in FIG. 2, the gap g in the X-axis direction is formed between the floating electrode 17 and the linear conductor 9 or 12. Accordingly, the floating electrode 17 is not in contact with the linear conductors 9 and 12, and is spaced apart from the linear conductors 9 and 12. The floating electrode 17 capacitively couples the open end portion 9B2 of the linear conductor 9 and the open end portion 12A2 of the linear conductor 12 in accordance with the size of the gap g.

Here, filter operation by the three resonators 8, 11, and 14 will be described with reference to an equivalent circuit of the filter 1 illustrated in FIG. 4.

The second open portion 9B of the linear conductor 9 overlaps the coupling portion 15B of the linear conductor 15 (see FIG. 1 and FIG. 2). Thus, the resonator 8 at the input stage is capacitively coupled to the resonator 14 at the intermediate stage serving as a next stage. Further, the coupling portion 15C of the linear conductor 15 overlaps the second open portion 12B of the linear conductor 12 (see FIG. 1 and FIG. 2). Thus, the resonator 14 at the intermediate stage is capacitively coupled to the resonator 11 at the output stage serving as a next stage. As a result, the three resonators 8, 11, and 14 pass a signal in a band near the resonant frequency of the resonators 8, 11, and 14.

Further, the first open portion 9A of the linear conductor 9 is an open stub. Similarly, the first open portion 12A of the linear conductor 12 is an open stub. These open stubs form an attenuation pole on a low-frequency side of a pass band of the filter 1.

In addition, the floating electrode 16 is disposed between the first open portion 9A of the resonator 8 and the second open portion 12B of the resonator 11 (see FIG. 1 and FIG. 2). Thus, the first open portion 9A of the resonator 8 at the input stage and the second open portion 12B of the resonator 11 at the output stage are capacitively coupled to each other. Similarly, the floating electrode 17 is disposed between the first open portion 12A of the resonator 11 and the second open portion 9B of the resonator 8 (see FIG. 1 and FIG. 2). Thus, the first open portion 12A of the resonator 11 at the output stage and the second open portion 12B of the resonator 8 at the input stage are capacitively coupled to each other. As a result, another attenuation pole can be added in a vicinity of the attenuation pole.

Here, the gap g in the X-axis direction is formed between the floating electrode 16 and the linear conductor 9 or 12. Similarly, the gap g in the X-axis direction is formed between the floating electrode 17 and the linear conductor 9 or 12. Attenuation and a frequency of the attenuation pole change according to the size of the gap g. Thus, frequency characteristics of S21 (a transmission coefficient) of S parameters were determined by simulation for cases where the size of the gap g was varied. Examples of the result are shown in FIG. 6 and FIG. 7.

Figure 6:
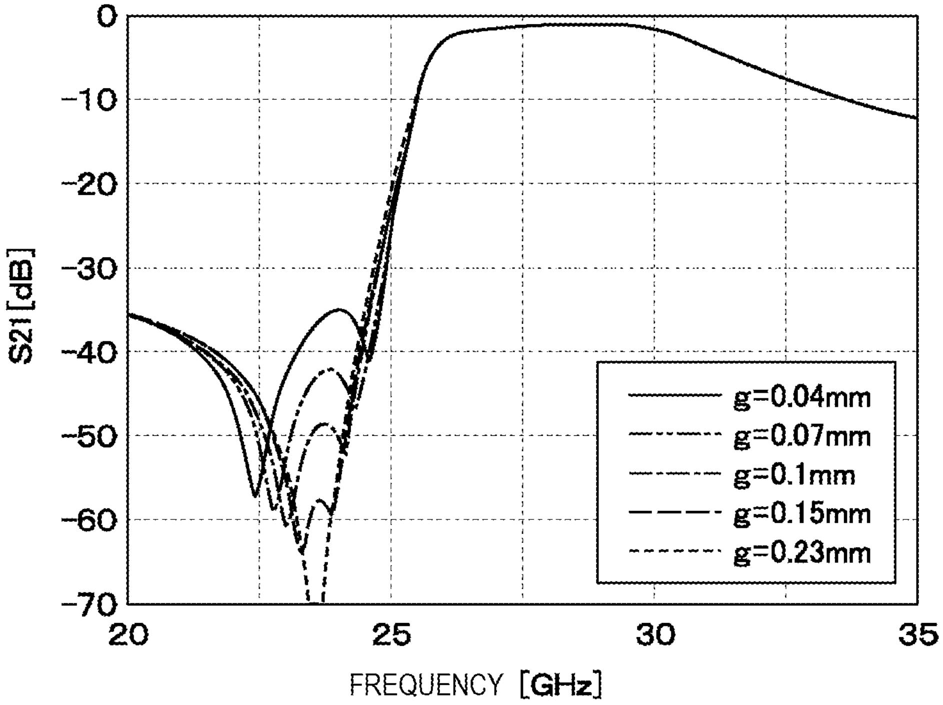
FIG. 6 is a characteristic diagram showing frequency characteristics of a transmission coefficient of the filter for a case where a size of a gap is varied.
Figure 7:
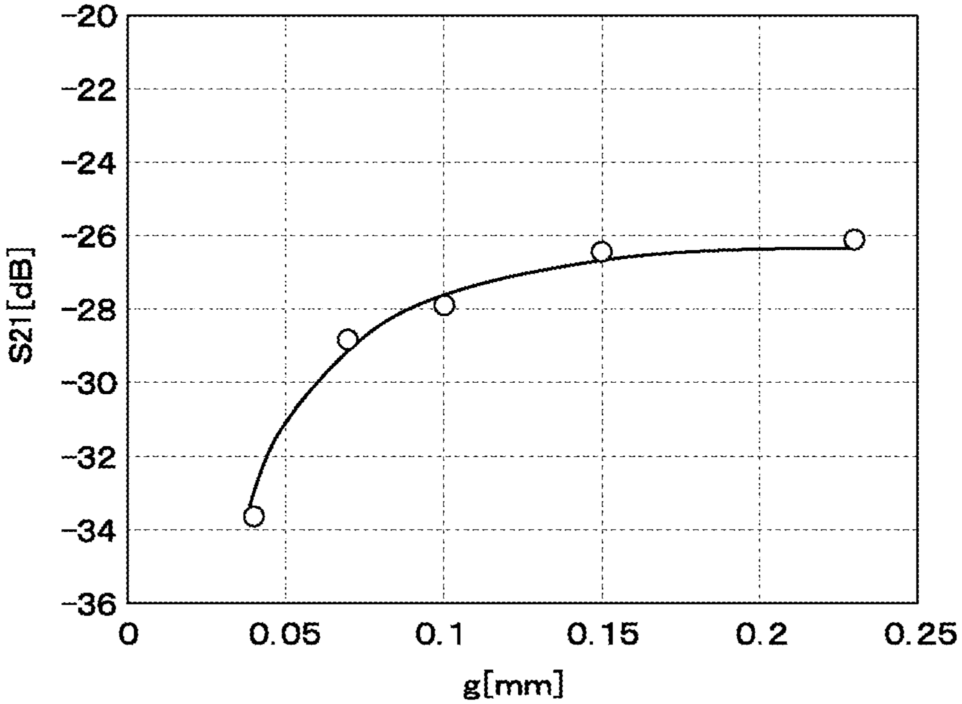
FIG. 7 is a characteristic diagram showing a relationship between a size of a gap and a transmission coefficient at a frequency of 25 GHz.

As shown in FIG. 6, when the gap g is large, coupling between the linear conductors 9 and 12 weakens, and one attenuation pole is formed. On the other hand, as the gap g is decreased, the coupling between the linear conductors 9 and 12 strengthens, and two attenuation poles are formed. In addition, as shown in FIG. 7, the attenuation is increased as the gap g is decreased at a specific frequency (for example, 25 GHz) positioned on a low-frequency side of the pass band.

Thus, the filter 1 according to the present embodiment includes the multilayer substrate 2 (dielectric substrate), and the resonators 8, 11, and 14 at the three stages provided in the multilayer substrate 2, and coupled to the next stage. In addition to this, the resonator 8 at the input stage is formed by the linear conductor 9 having the C-shape in a plan view, and is directly coupled to the transmission line 10 on the input side provided in the multilayer substrate 2. The resonator 11 at the output stage is formed by the linear conductor 12 having the C-shape in a plan view, and is directly coupled to the transmission line 13 on the output side provided in the multilayer substrate 2.

The multilayer substrate 2 is provided with the floating electrode 16 (cross-coupling electrode) for coupling the open end portion 9A2 (end portion) of the linear conductor 9 of the resonator 8 at the input stage and the open end portion 12B2 (end portion) of the linear conductor 12 of the resonator 11 at the output stage. The multilayer substrate 2 is provided with the floating electrode 17 (cross-coupling electrode) for coupling the open end portion 9B2 (end portion) of the linear conductor 9 of the resonator 8 at the input stage and the open end portion 12A2 (end portion) of the linear conductor 12 of the resonator 11 at the output stage.

With this configuration, the three resonators 8, 11, and 14 coupled to the next stage constitute a band pass filter, and pass a signal in a band near the resonant frequency of the resonators 8, 11, and 14. Further, the resonator 8 at the input stage has the first open portion 9A as the open stub. Further, the resonator 11 at the output stage has the first open portion 12A as the open stub. At this time, length dimensions of the first open portion 9A and 12A are larger than half length dimensions of the linear conductors 9 and 12, respectively. Thus, the first open portions 9A and 12A form the attenuation pole on the low-frequency side of the pass band.

Figure 5:
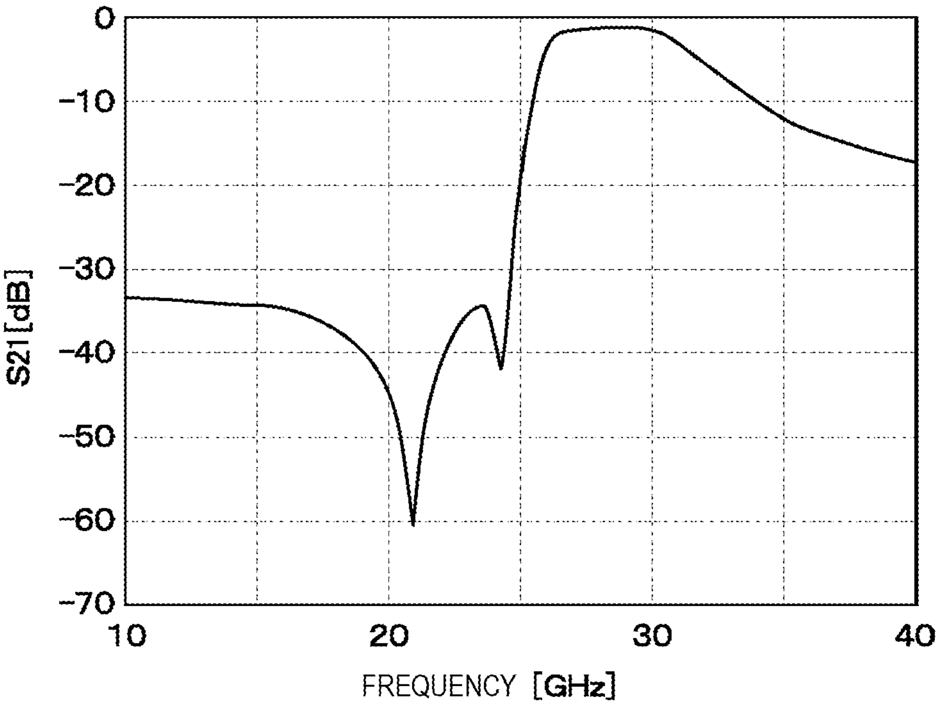
FIG. 5 is a characteristic diagram showing frequency characteristics of a transmission coefficient for the filter according to the first embodiment.

In addition, the floating electrode 16 capacitively couples the open end portion 9A2 of the linear conductor 9 and the open end portion 12B2 of the linear conductor 12. The floating electrode 17 capacitively couples the open end portion 9B2 of the linear conductor 9 and the open end portion 12A2 of the linear conductor 12. Accordingly, as shown in FIG. 5, in addition to the attenuation pole formed by the first open portions 9A and 12A on the low-frequency side of the pass band, the additional attenuation pole can be formed positioned in a vicinity of this attenuation pole. At this time, the size of the gap g formed between the floating electrode 16 or 17 and the linear conductors 9 and 12 can be adjusted according to a size of the floating electrode 16 or 17. This makes it possible to easily change coupling strength between the linear conductor 9 and the linear conductor 12, without necessarily changing a positional relationship among the resonators 8, 11, and 14. As a result, desired attenuation can be obtained without necessarily complicating the respective shapes of the resonators 8, 11, and 14.

Further, the linear conductor 9 of the resonator 8 at the input stage and the linear conductor 12 of the resonator 11 at the output stage are positioned between the insulating layers 4 and 5 of the multilayer substrate 2, and disposed in the same layer (see FIG. 3). The multilayer substrate 2 is provided with the resonator 14 at the intermediate stage positioned in a layer different from that of the linear conductor 9 of the resonator 8 at the input stage and the linear conductor 12 of the resonator 11 at the output stage, in which the coupling portion 15B (first end portion) is capacitively coupled to the resonator 8 at the input stage and the coupling portion 15C (second end portion) is capacitively coupled to the resonator 11 at the output stage (see FIG. 1). Thus, the three resonators 8, 11, and 14 can be coupled to constitute the band pass filter.

Further, the ground electrodes 6 and 7 are provided on the two main surfaces (the first main surface 2A and the second main surface 2B) of the multilayer substrate 2, respectively. The resonators 8, 11, and 14 at the three stages are provided inside the multilayer substrate 2. Thus, since the resonators 8, 11, and 14 at the three stages are sandwiched between the ground electrodes 6 and 7, it is possible to suppress interference from external electromagnetic waves, and to suppress radiation of electromagnetic waves to the external.

Further, the resonators 8, 11, and 14 at the three stages are formed in a rotationally symmetric shape when the multilayer substrate 2 is viewed in a plan view. Thus, the resonators 8, 11, and 14 can be easily designed, and mass productivity of the filter 1 can be improved.

Next, a second embodiment of the present disclosure will be described with reference to FIG. 8 to FIG. 10. The second embodiment is characterized in that both of a resonator at an input stage and a resonator at an output stage are formed by linear conductors each having an open stub, respectively, and a length dimension of each of these open stubs is shorter than half an entire length dimension of the linear conductor. Note that, in the second embodiment, the same components as those in the first embodiment are denoted by the same reference numerals, and the description thereof will be omitted.

A filter 21 according to the second embodiment includes the multilayer substrate 2, the ground electrodes 6, 7, resonators 22, 24, 26, the transmission lines 10, 13, and a floating electrode 28, similarly to the filter 1 according to the first embodiment.

Figure 8:
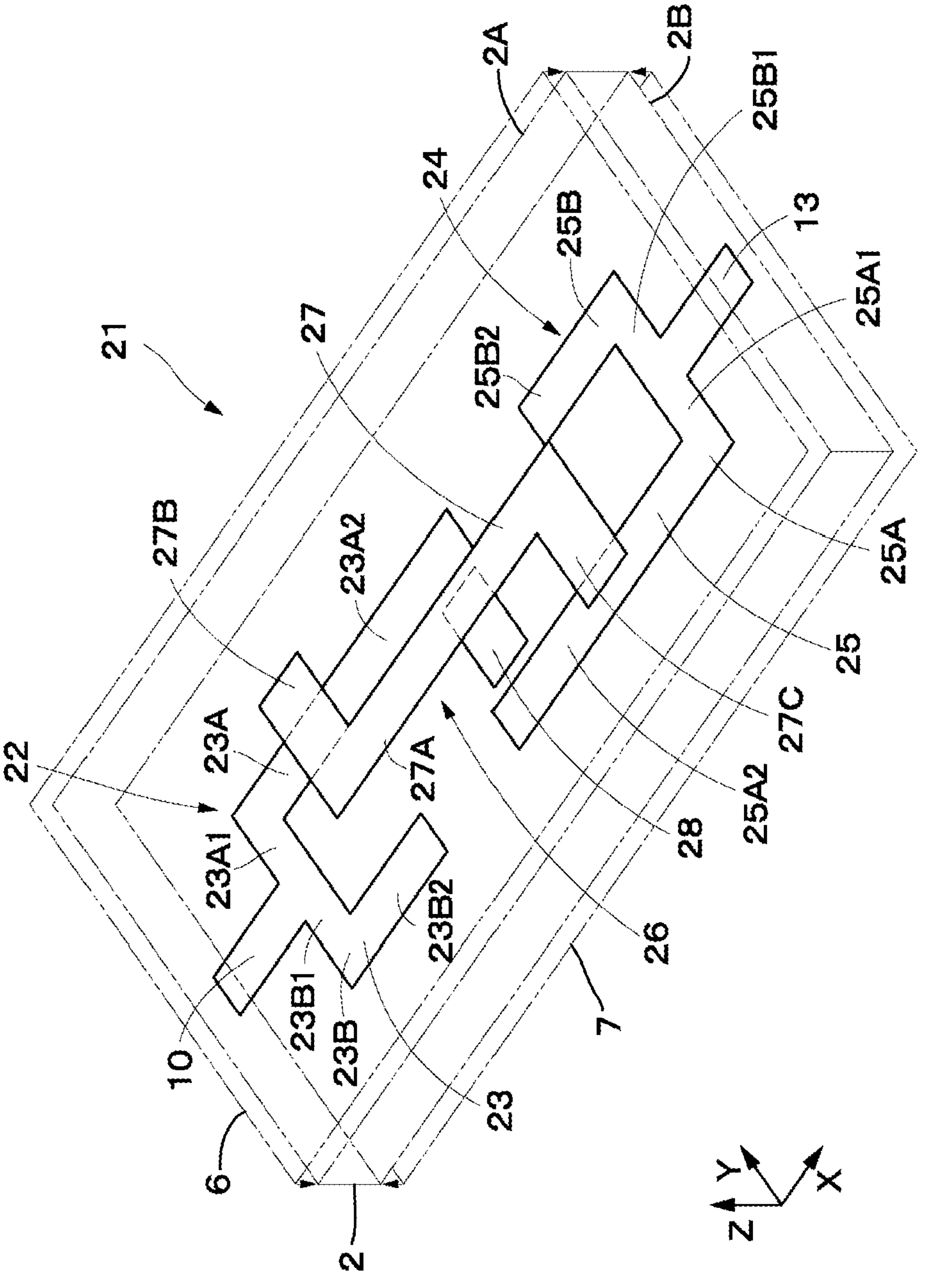
FIG. 8 is a perspective view illustrating a filter according to a second embodiment of the present disclosure.
Figure 9:
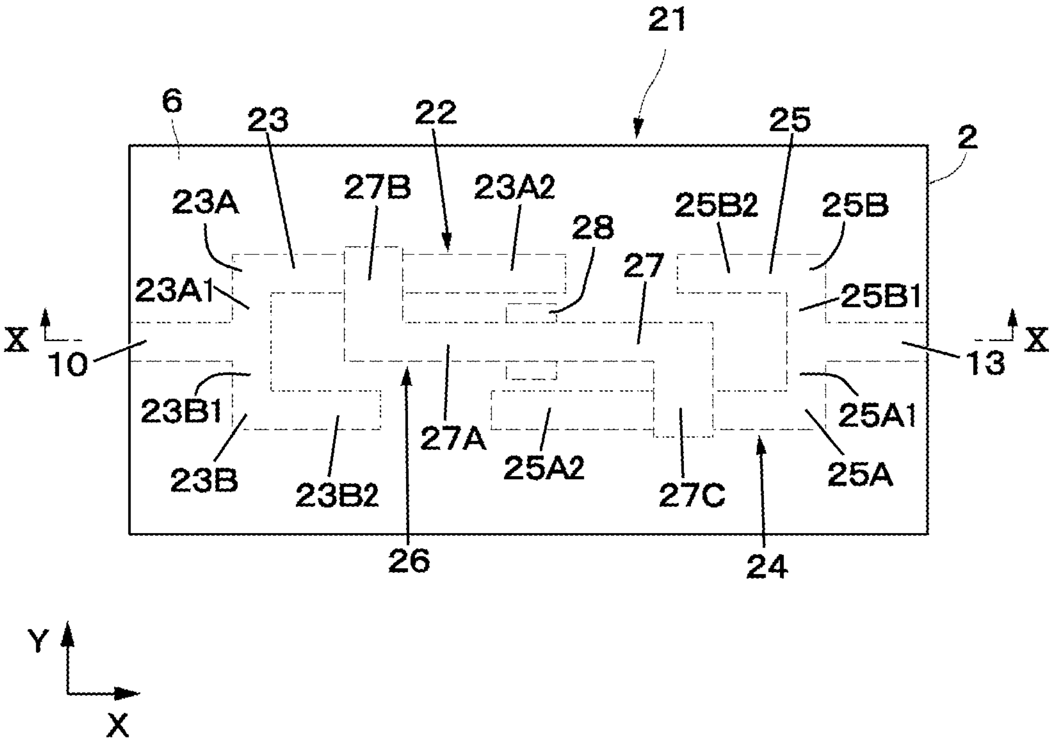
FIG. 9 is a plan view illustrating the filter in FIG. 8.
Figure 10:
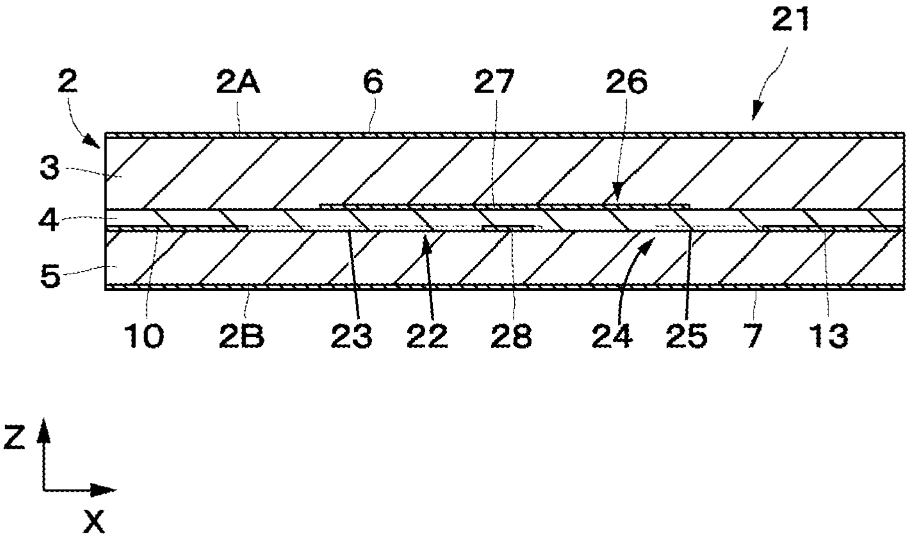
FIG. 10 is a cross-sectional view of the filter as viewed in an X-X direction indicated by arrows in FIG. 9.

The resonator 22 at an input stage is provided inside the multilayer substrate 2 (see FIG. 8 to FIG. 10). The resonator 22 is formed by a linear conductor 23 having a C shape in a plan view. As illustrated in FIG. 10, the linear conductor 23 is positioned between the insulating layer 4 and the insulating layer 5, and is formed by an elongated strip-shaped conductor pattern. A length dimension of the linear conductor 23 is set to, for example, ½ of a wave length in the multilayer substrate 2 corresponding to a resonant frequency. Both ends of the linear conductor 23 are open. Thus, the linear conductor 23 constitutes a half wave length resonator whose both the ends are open.

As illustrated in FIG. 8 and FIG. 9, the linear conductor 23 includes a first open portion 23A and a second open portion 23B. The first open portion 23A of the linear conductor 23 is formed in an L shape in a plan view. The first open portion 23A has a connecting portion 23A1 and an open end portion 23A2. The connecting portion 23A1 of the first open portion 23A is aligned with a connecting portion 23B1 of the second open portion 23B, and extends in the Y-axis direction. A first end of the connecting portion 23A1 is electrically connected to the connecting portion 23B1. A second end of the connecting portion 23A1 is electrically connected to a first end of the open end portion 23A2.

The open end portion 23A2 of the first open portion 23A is one end portion (edge end portion) of the linear conductor 23, and extends in the X-axis direction. A second end of the open end portion 23A2 is electrically open.

The second open portion 23B of the linear conductor 23 is formed in an L shape in a plan view. The second open portion 23B has the connecting portion 23B1 and an open end portion 23B2. The connecting portion 23B1 of the second open portion 23B is aligned with the connecting portion 23A1 of the first open portion 23A, and extends in the Y-axis direction. A first end of the connecting portion 23B1 is electrically connected to the connecting portion 23A1. A second end of the connecting portion 23B1 is electrically connected to a first end of the open end portion 23B2.

The open end portion 23B2 of the second open portion 23B is another end portion (edge end portion) of the linear conductor 23, and extends in the X-axis direction. A second end of the open end portion 23B2 is electrically open. A length dimension of the second open portion 23B is smaller than half a length dimension of the linear conductor 23. Thus, the length dimension of the second open portion 23B is smaller than a length dimension of the first open portion 23A. The second open portion 23B of the linear conductor 23 is a quarter-wave open stub.

The transmission line 10 on an input side is electrically connected to an intermediate position of the linear conductor 23. To be more specific, the transmission line 10 is connected to the linear conductor 23 at a connecting position between the first open portion 23A and the second open portion 23B. The resonator 22 at the input stage is directly coupled to the transmission line 10 on the input side provided in the multilayer substrate 2.

The resonator 24 at an output stage is provided inside the multilayer substrate 2 (see FIG. 8 to FIG. 10). The resonator 24 is formed by a linear conductor 25 having a C shape in a plan view. As illustrated in FIG. 10, the linear conductor 25 is positioned between the insulating layer 4 and the insulating layer 5, and is formed by an elongated strip-shaped conductor pattern. A length dimension of the linear conductor 25 is set to, for example, ½ of a wave length in the multilayer substrate 2 corresponding to a resonant frequency. Both ends of the linear conductor 25 are open. Thus, the linear conductor 25 constitutes a half wave length resonator whose both the ends are open.

As illustrated in FIG. 8 and FIG. 9, the linear conductor 25 is spaced apart from the linear conductor 23 in the X-axis direction. The resonator 26 at an intermediate stage is disposed between the linear conductor 25 and the linear conductor 23. The linear conductor 25 is formed in a point-symmetric shape with the linear conductor 23 when the multilayer substrate 2 is viewed in a plan view. The linear conductor 25 includes a first open portion 25A and a second open portion 25B.

The first open portion 25A of the linear conductor 25 is formed in an L shape in a plan view. The first open portion 25A has a connecting portion 25A1 and an open end portion 25A2. The connecting portion 25A1 of the first open portion 25A is aligned with a connecting portion 25B1 of the second open portion 25B, and extends in the Y-axis direction. A first end of the connecting portion 25A1 is electrically connected to the connecting portion 25B1. A second end of the connecting portion 25A1 is electrically connected to a first end of the open end portion 25A2.

The open end portion 25A2 of the first open portion 25A is one end portion (edge end portion) of the linear conductor 25. The open end portion 25A2 of the first open portion 25A of the linear conductor 25 is aligned with the open end portion 23B2 of the second open portion 23B of the linear conductor 23, and extends in the X-axis direction. The open end portion 25A2 of the first open portion 25A of the linear conductor 25 is spaced apart from the open end portion 23B2 of the second open portion 23B of the linear conductor 23 in the X-axis direction. A second end of the open end portion 25A2 is electrically open.

The second open portion 25B of the linear conductor 25 is formed in an L shape in a plan view. The second open portion 25B has the connecting portion 25B1 and an open end portion 25B2. The connecting portion 25B1 of the second open portion 25B is aligned with the connecting portion 25A1 of the first open portion 25A, and extends in the Y-axis direction. A first end of the connecting portion 25B1 is electrically connected to the connecting portion

25A1. A second end of the connecting portion 25B1 is electrically connected to a first end of the open end portion 25B2.

The open end portion 25B2 of the second open portion 25B is another end portion (edge end portion) of the linear conductor 25. The open end portion 25B2 of the second open portion 25B of the linear conductor 25 is aligned with the open end portion 23A2 of the first open portion 23A of the linear conductor 23, and extends in the X-axis direction. A second end of the open end portion 25B2 is electrically open. A length dimension of the second open portion 25B is smaller than half a length dimension of the linear conductor 25. Thus, the length dimension of the second open portion 25B is smaller than a length dimension of the first open portion 25A. The second open portion 25B of the linear conductor 25 is a quarter-wave open stub.

The transmission line 13 on an output side is electrically connected to an intermediate position of the linear conductor 25. To be more specific, the transmission line 13 is connected to the linear conductor 25 at a connecting position between the first open portion 25A and the second open portion 25B. The resonator 24 at the output stage is directly coupled to the transmission line 13 on the output side provided in the multilayer substrate 2.

The resonator 26 at the intermediate stage is positioned between the resonator 22 at the input stage and the resonator 24 at the output stage, and is provided in the multilayer substrate 2. The resonator 26 is provided inside the multilayer substrate 2 (see FIG. 8 to FIG. 10). The resonator 26 is formed by a linear conductor 27 that is linear. As illustrated in FIG. 10, the linear conductor 27 is positioned between the insulating layer 3 and the insulating layer 4, and is formed by an elongated strip-shaped conductor pattern. Thus, the insulating layer 4 is sandwiched between the linear conductor 27, and the linear conductors 23 and 25. A length dimension of the linear conductor 27 is set to, for example, ½ of a wave length in the multilayer substrate 2 corresponding to a resonant frequency. Both ends of the linear conductor 27 are open. Thus, the linear conductor 27 constitutes a half wave length resonator whose both the ends are open.

As illustrated in FIG. 8 and FIG. 9, the linear conductor 27 includes a main body portion 27A and coupling portions 27B and 27C. The main body portion 27A is disposed at a position surrounded by the linear conductor 23 of the resonator 22 and the linear conductor 25 of the resonator 24 in a plan view. The main body portion 27A extends in the X-axis direction. A first end of the main body portion 27A is electrically connected to the coupling portion 27B. A second end of the main body portion 27A is electrically connected to the coupling portion 27C.

The coupling portion 27B is a first end portion of the linear conductor 27 and extends in the Y-axis direction from the first end of the main body portion 27A. The coupling portion 27B is disposed at an intermediate position of the open end portion 23A2 in the X-axis direction, and crosses the open end portion 23A2 of the first open portion 23A. The coupling portion 27B and the open end portion 23A2 are spaced apart from each other in the Z-axis direction. Accordingly, the coupling portion 27B of the linear conductor 27 is capacitively coupled to the open end portion 23A2 of the linear conductor 23.

The coupling portion 27C is a second end portion of the linear conductor 27, and extends in the Y-axis direction from the second end of the main body portion 27A. The coupling portion 27C is disposed at an intermediate position of the open end portion 25A2 in the X-axis direction, and crosses the open end portion 25A2 of the first open portion 25A. The coupling portion 27C and the open end portion 25A2 are spaced apart from each other in the Z-axis direction. Accordingly, the coupling portion 27C of the linear conductor 27 is capacitively coupled to the open end portion 25A2 of the linear conductor 25.

The floating electrode 28 is a cross-coupling electrode for cross-coupling the resonator 22 at the input stage and the resonator 24 at the output stage. As illustrated in FIG. 8 and FIG. 9, the floating electrode 28 is positioned between the open end portion 23A2 of the linear conductor 23 and the open end portion 25A2 of the linear conductor 25, and is provided inside the multilayer substrate 2. The floating electrode 28 is disposed between a second end part of the open end portion 23A2 and a second end part of the open end portion 25A2. At this time, the floating electrode 28 and the linear conductor 27 are spaced apart from each other in the Z-axis direction. Thus, the floating electrode 28 faces a central portion of the linear conductor 27 while being insulated from the linear conductor 27. As illustrated in FIG. 10, the floating electrode 28 is positioned between the insulating layer 4 and the insulating layer 5, and is formed in an island shape. As illustrated in FIG. 9, a gap in the Y-axis direction is formed between the floating electrode 28 and the linear conductor 23 or 25. Accordingly, the floating electrode 28 is not in contact with the linear conductors 23 and 25, and is spaced apart from the linear conductors 23 and 25. The floating electrode 28 capacitively couples the open end portion 23A2 of the linear conductor 23 and the open end portion 25A2 of the linear conductor 25 in accordance with the size of the gap.

Thus, also in the second embodiment configured as described above, almost as in the first embodiment described above, with the filter 21, desired attenuation can be obtained without necessarily complicating the respective shapes of the resonators 22, 24, and 26. In addition, in the second embodiment, the resonator 22 at the input stage and the resonator 24 at the output stage are formed by the linear conductors 23 and 25, respectively. The linear conductors 23 and 25 have the second open portions 23B and 25B serving as open stubs, respectively. The length of the second open portion 23B is shorter than half an entire length dimension of the linear conductor 23, and the length of the second open portion 25B is shorter than half an entire length of the linear conductor 25. Thus, the second open portions 23B and 25B form an attenuation pole on a high-frequency side of a pass band.

Figure 11:
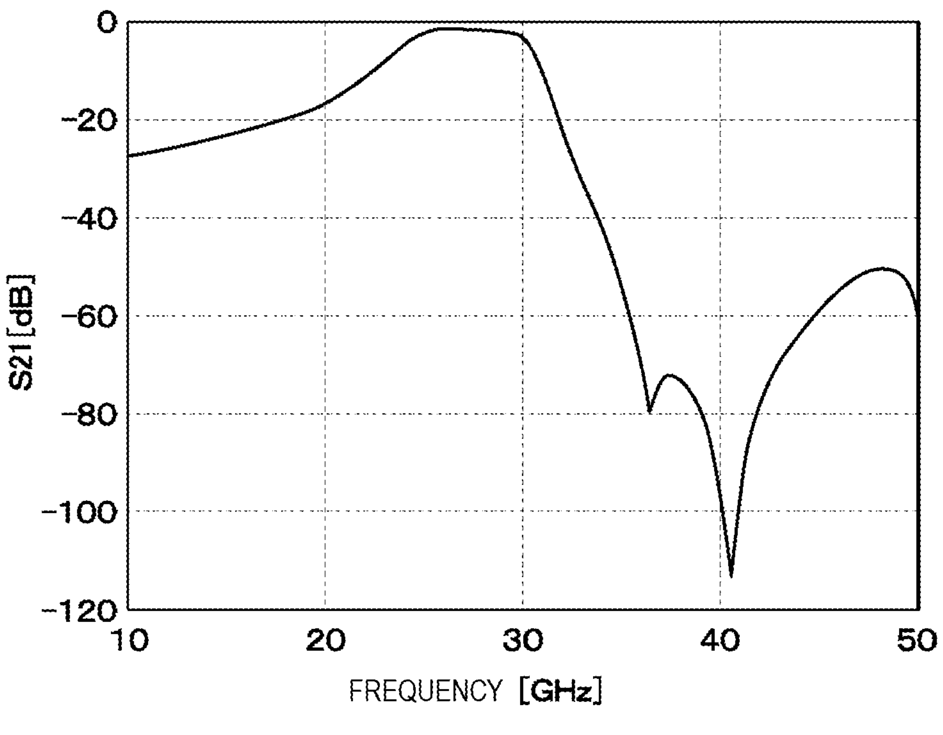
FIG. 11 is a characteristic diagram showing frequency characteristics of a transmission coefficient for the filter according to the second embodiment.

In addition, the floating electrode 28 capacitively couples the open end portion 23A2 of the linear conductor 23 and the open end portion 25A2 of the linear conductor 25. Accordingly, as shown in FIG. 11, in addition to an attenuation pole formed by the second open portions 23B and 25B on a high-frequency side of a pass band, an additional attenuation pole can be formed positioned in a vicinity of this attenuation pole.

Figure 12:
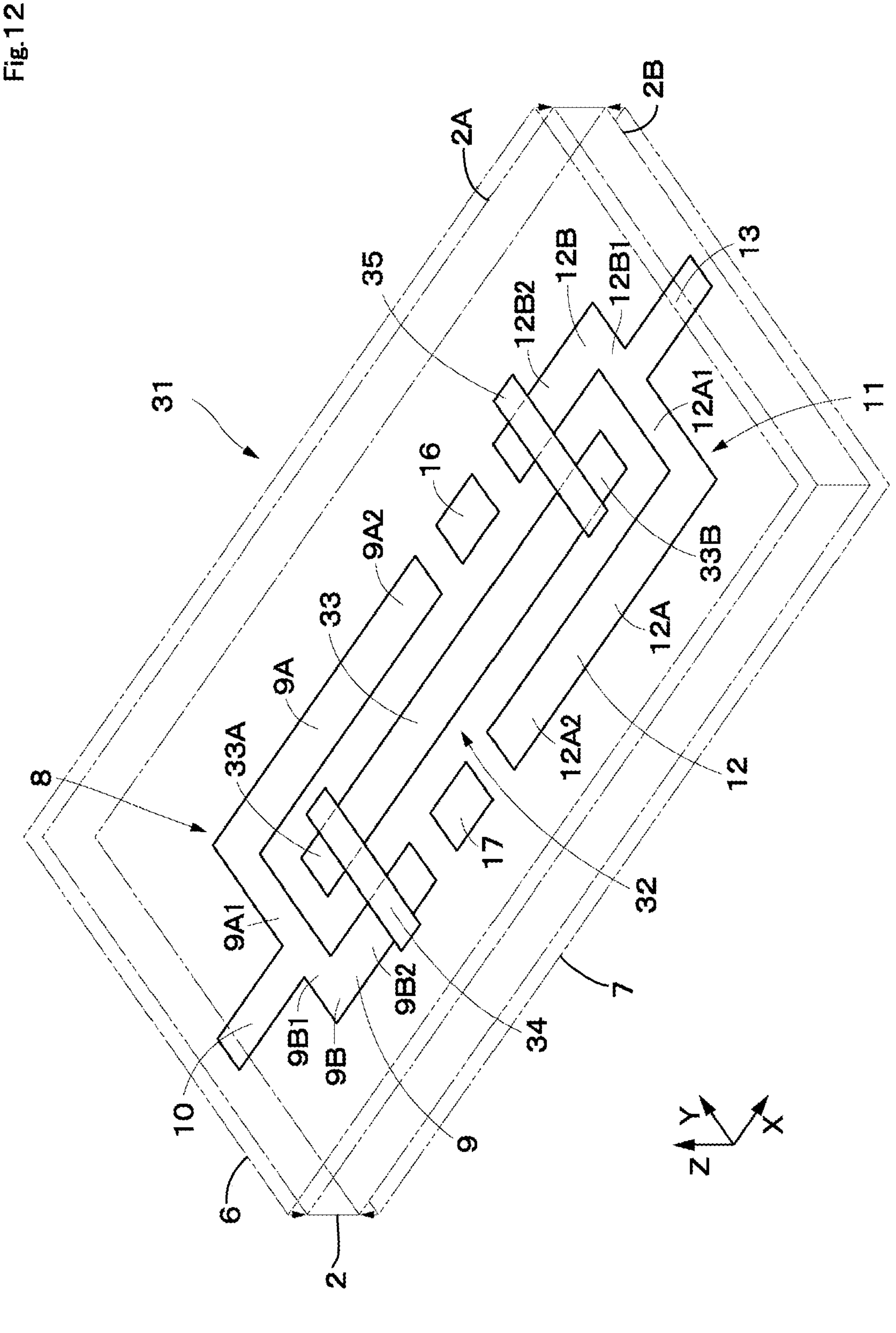
FIG. 12 is a perspective view illustrating a filter according to a third embodiment of the present disclosure.
Figure 13:
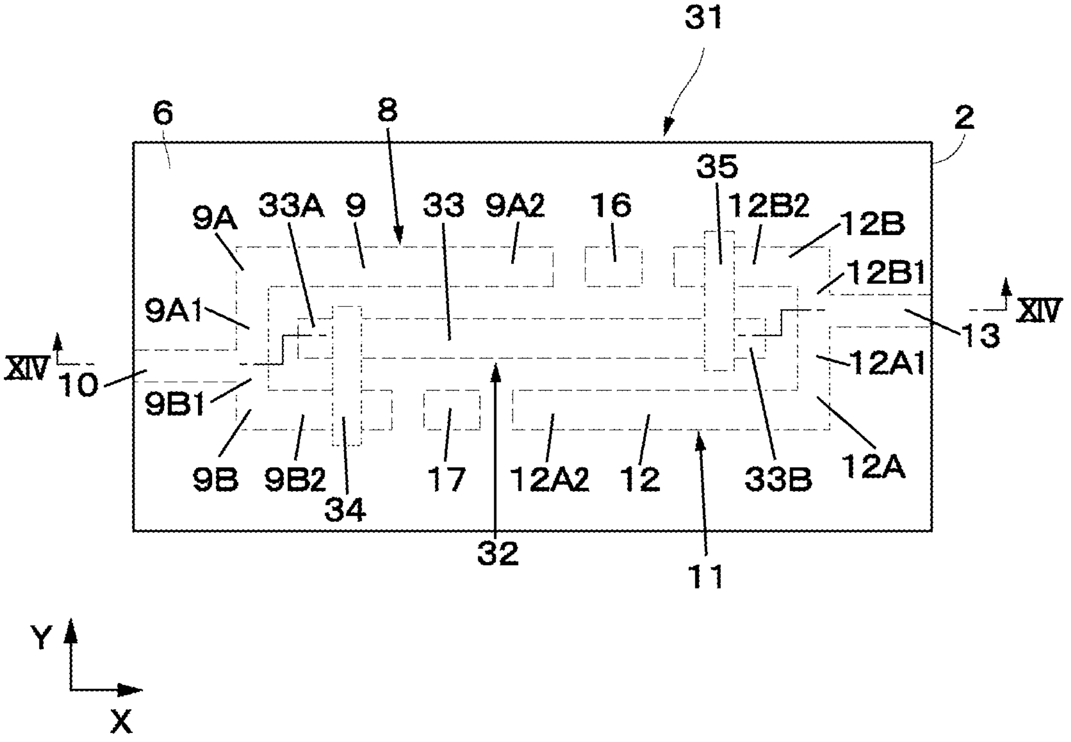
FIG. 13 is a plan view illustrating the filter in FIG. 12.
Figure 14:
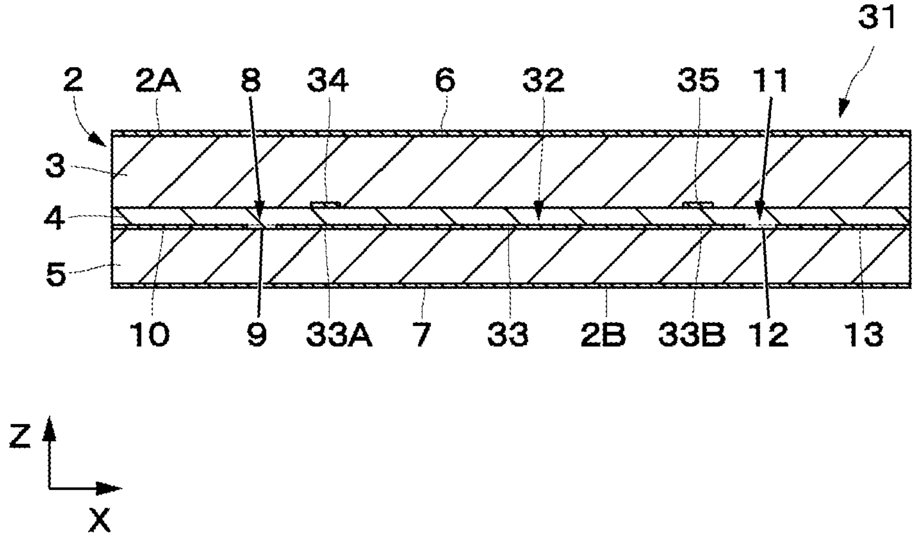
FIG. 14 is a cross-sectional view of the filter as viewed in a direction XIV-XIV indicated by arrows in FIG. 13.

Next, a third embodiment of the present disclosure will be described with reference to FIG. 12 to FIG. 14. The third embodiment is characterized in that linear conductors of respective three resonators are disposed in the same layer of a dielectric substrate formed of a multilayer substrate, and the dielectric substrate is provided with a floating electrode that is positioned in a layer different from that of the linear conductors of the respective three resonators, and capacitively couples two adjacent resonators. Note that, in the third embodiment, the same components as those in the first embodiment are denoted by the same reference numerals, and the description thereof will be omitted.

A filter 31 according to the third embodiment includes the multilayer substrate 2, the ground electrodes 6, 7, the resonators 8, 11, a resonator 32, the transmission lines 10, 13, and the floating electrodes 16, 17, floating electrodes 34, and 35, similarly to the filter 1 according to the first embodiment.

The resonator 32 at an intermediate stage is positioned between the resonator 8 at an input stage and the resonator 11 at an output stage, and is provided in the multilayer substrate 2. The resonator 32 is provided inside the multilayer substrate 2 (see FIG. 12 to FIG. 14). The resonator 32 is formed by a linear conductor 33 that is linear. As illustrated in FIG. 14, the linear conductor 33 is positioned between the insulating layer 4 and the insulating layer 5, and is formed by an elongated strip-shaped conductor pattern. Thus, the three resonators 8, 11, and 32 are disposed in the same layer of the multilayer substrate 2. A length dimension of the linear conductor 33 is set to, for example, ½ of a wave length in the multilayer substrate 2 corresponding to a resonant frequency. A first end portion 33A and a second end portion 33B positioned at both ends of the linear conductor 33, respectively, are open. Thus, the linear conductor 33 constitutes a half wave length resonator whose both the ends are open.

The floating electrode 34 is positioned in a layer different from that of the linear conductors 9, 12, and 33, and is provided in the multilayer substrate 2. As illustrated in FIG. 14, the floating electrode 34 is positioned between the insulating layer 3 and the insulating layer 4, and is formed in a band shape extending in the Y-axis direction. Thus, the insulating layer 4 is sandwiched between the floating electrode 34, and the linear conductors 9 and 33. As illustrated in FIG. 12 and FIG. 13, the floating electrode 34 is disposed at a position facing the open end portion 9B2 of the linear conductor 9 and the first end portion 33A of the linear conductor 33. The floating electrode 34 extends in the Y-axis direction, crosses the linear conductor 33, and crosses the open end portion 9B2 of the second open portion 9B. The floating electrode 34, and the linear conductors 9 and 33 are spaced apart from each other in the Z-axis direction. Thus, the first end portion 33A of the linear conductor 33 is capacitively coupled to the open end portion 9B2 of the linear conductor 9.

The floating electrode 35 is positioned in a layer different from that of the linear conductors 9, 12, and 33, and is provided in the multilayer substrate 2. As illustrated in FIG. 14, the floating electrode 35 is positioned between the insulating layer 3 and the insulating layer 4, and is formed in a band shape extending in the Y-axis direction. Thus, the insulating layer 4 is sandwiched between the floating electrode 35, and the linear conductors 12 and 33. As illustrated in FIG. 12 and FIG. 13, the floating electrode 35 is disposed at a position facing the open end portion 12B2 of the linear conductor 12 and the second end portion 33B of the linear conductor 33. The floating electrode 35 extends in the Y-axis direction, crosses the linear conductor 33, and crosses the open end portion 12B2 of the second open portion 12B. The floating electrode 35, and the linear conductors 12 and 33 are spaced apart from each other in the Z-axis direction. Thus, the second end portion 33B of the linear conductor 33 is capacitively coupled to the open end portion 12B2 of the linear conductor 12.

Thus, also in the third embodiment configured as described above, almost as in the first embodiment described above, with the filter 31, a plurality of attenuation poles can be formed on a low-frequency side of a pass band, and desired attenuation can be obtained without necessarily complicating the respective shapes of the resonators 8, 11, and 32.

Figure 15:
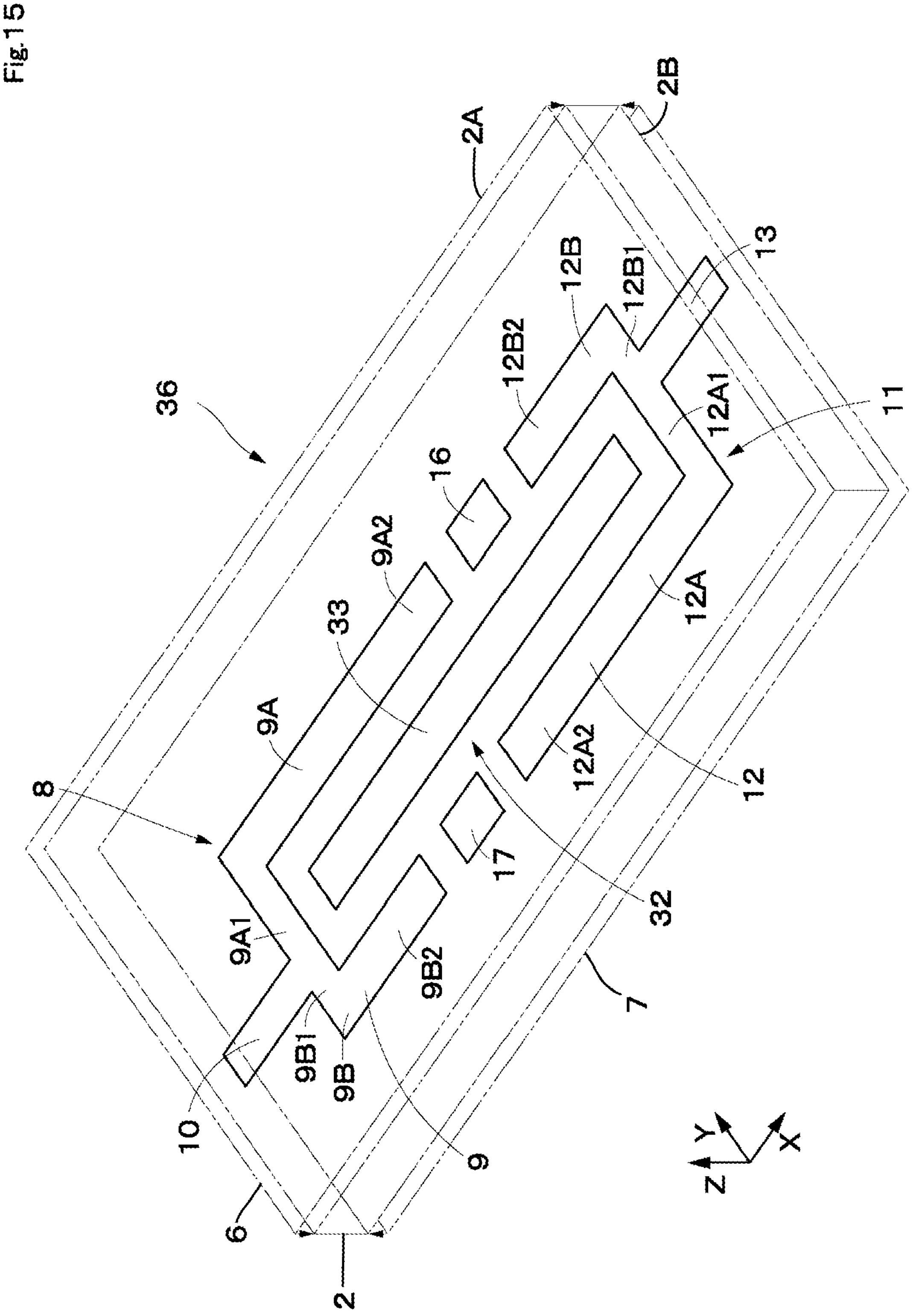
FIG. 15 is a perspective view illustrating a filter according to a first modification.

Note that, the open end portion 9B2 of the linear conductor 9 and the linear conductor 33 extend parallel to each other in the X-axis direction with a gap interposed therebetween. Thus, by appropriately setting the shapes and the like of the linear conductors 9 and 33, respectively, the linear conductors 9 and 33 can be coupled without necessarily the floating electrode 34. Similarly, by appropriately setting the shapes and the like of the linear conductors 12 and 33, respectively, the linear conductors 12 and 33 can be coupled without necessarily the floating electrode 35. In this case, the floating electrodes 34 and 35 may be omitted as in a filter 36 according to a first modification illustrated in FIG. 15.

Next, a fourth embodiment of the present disclosure will be described with reference to FIG. 16. The fourth embodiment is characterized in that linear conductors of respective three resonators are disposed in the same layer of a dielectric substrate formed of a multilayer substrate, and a cross-coupling electrode is a floating electrode positioned in a different layer from that of a linear conductor of a resonator at an input stage and a linear conductor of a resonator at an output stage, and capacitively coupling the resonator at the input stage and the resonator at the output stage. Note that, in the fourth embodiment, the same components as those in the second embodiment are denoted by the same reference numerals, and the description thereof will be omitted.

A filter 41 according to the fourth embodiment includes the multilayer substrate 2, the ground electrodes 6, 7, the resonators 22, 24, a resonator 42, the transmission lines 10, 13, floating electrodes 44, 45, and 46, almost similarly to the filter 21 according to the second embodiment.

Figure 16:
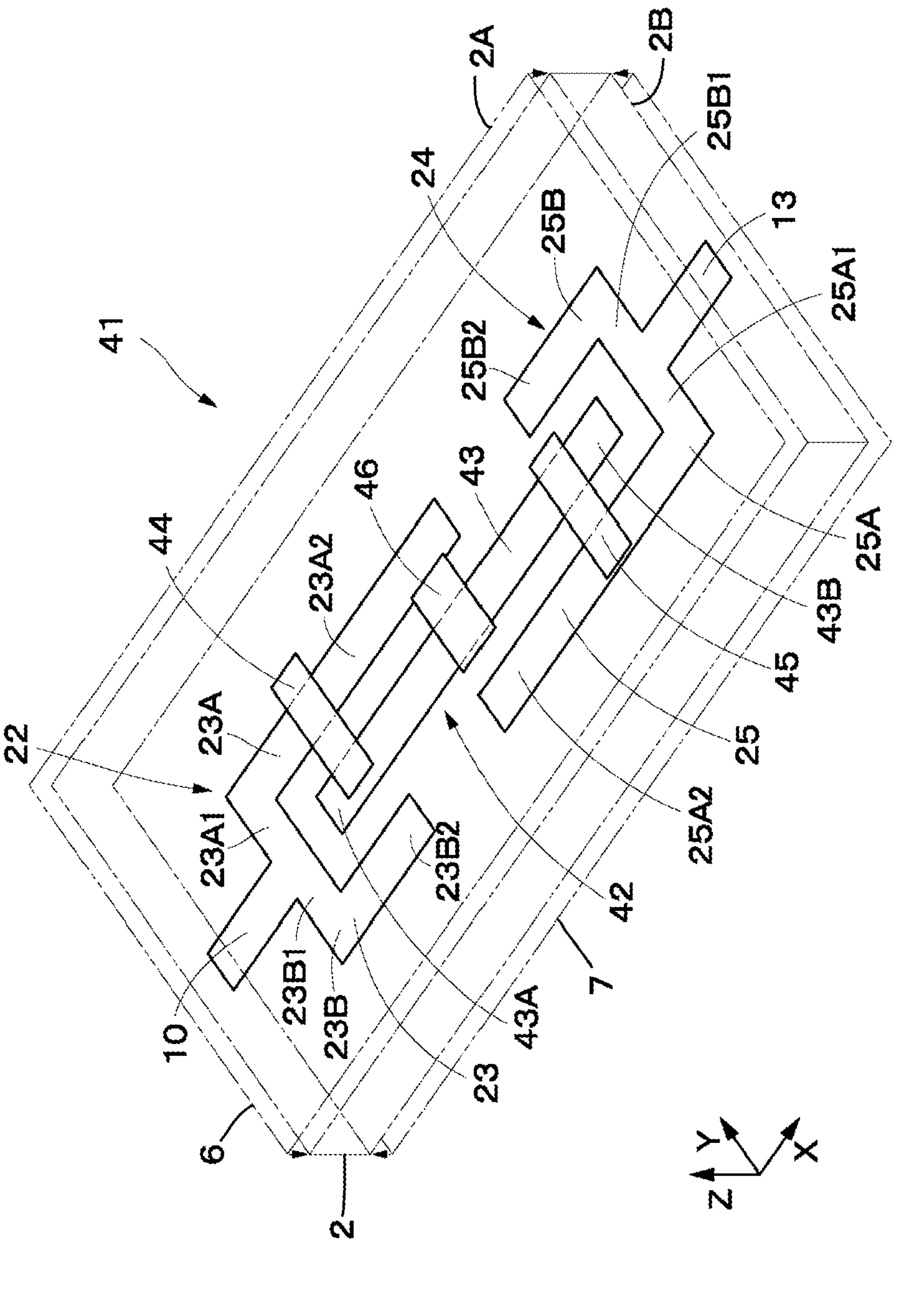
FIG. 16 is a perspective view illustrating a filter according to a fourth embodiment of the present disclosure.

As illustrated in FIG. 16, the resonator 42 at an intermediate stage is positioned between the resonator 22 at an input stage and the resonator 24 at an output stage, and is provided in the multilayer substrate 2. The resonator 42 is provided inside the multilayer substrate 2. The resonator 42 is formed by a linear conductor 43 that is linear. The linear conductor 43 is formed by an elongated strip-shaped conductor pattern. The three resonators 22, 24, and 42 are disposed in the same layer of the multilayer substrate 2. A length dimension of the linear conductor 43 is set to, for example, ½ of a wave length in the multilayer substrate 2 corresponding to a resonant frequency. A first end portion 43A and a second end portion 43B positioned at both ends of the linear conductor 43, respectively, are open. Thus, the linear conductor 43 constitutes a half wave length resonator whose both the ends are open.

The floating electrode 44 is positioned in a layer different from that of the linear conductors 23, 25, and 43, and is provided in the multilayer substrate 2. The floating electrode 44 is positioned in a layer closer to the first main surface 2A than the linear conductors 23, 25, and 43, and is formed in a band shape extending in the Y-axis direction. The floating electrode 44 is disposed at a position facing the open end portion 23A2 of the linear conductor 23 and the first end portion 43A of the linear conductor 43. The floating electrode 44 extends in the Y-axis direction, crosses the linear conductor 43, and crosses the open end portion 23A2 of the first open portion 23A. The floating electrode 44, and the linear conductors 23 and 43 are spaced apart from each other in the Z-axis direction. Thus, the first end portion 43A of the linear conductor 43 is capacitively coupled to the open end portion 23A2 of the linear conductor 23.

The floating electrode 45 is positioned in a layer different from that of the linear conductors 23, 25, and 43, and is provided in the multilayer substrate 2. The floating electrode 45 is positioned in the same layer as that of the floating electrode 44, and is formed in a band shape extending in the Y-axis direction. The floating electrode 45 is disposed at a position facing the open end portion 25A2 of the linear conductor 25 and the second end portion 43B of the linear conductor 43. The floating electrode 45 extends in the Y-axis direction, crosses the linear conductor 43, and crosses the open end portion 25A2 of the first open portion 25A. The floating electrode 45, and the linear conductors 25 and 43 are spaced apart from each other in the Z-axis direction. Thus, the second end portion 43B of the linear conductor 43 is capacitively coupled to the open end portion 25A2 of the linear conductor 25.

The floating electrode 46 is a cross-coupling electrode for cross-coupling the resonator 22 at the input stage and the resonator 24 at the output stage. The floating electrode 46 is positioned in a layer different from that of the linear conductors 23, 25, and 43, and is provided in the multilayer substrate 2. The floating electrode 46 is another floating electrode separate from the floating electrodes 44 and 45. The floating electrode 46 is positioned in the same layer as that of the floating electrodes 44 and 45, and is formed in a band shape extending in the Y-axis direction. The floating electrode 46 is disposed between a second end part of the open end portion 23A2 and a second end part of the open end portion 25A2. The floating electrode 46 capacitively couples the open end portion 23A2 of the linear conductor 23 and the open end portion 25A2 of the linear conductor 25. At this time, the floating electrode 46 faces a central portion of the linear conductor 43 while being insulated from the linear conductor 27.

Thus, also in the fourth embodiment configured as described above, almost as in the second embodiment described above, with the filter 41, a plurality of attenuation poles can be formed on a high-frequency side of a pass band, and desired attenuation can be obtained without necessarily complicating the respective shapes of the resonators 22, 24, and 42.

Figure 17:
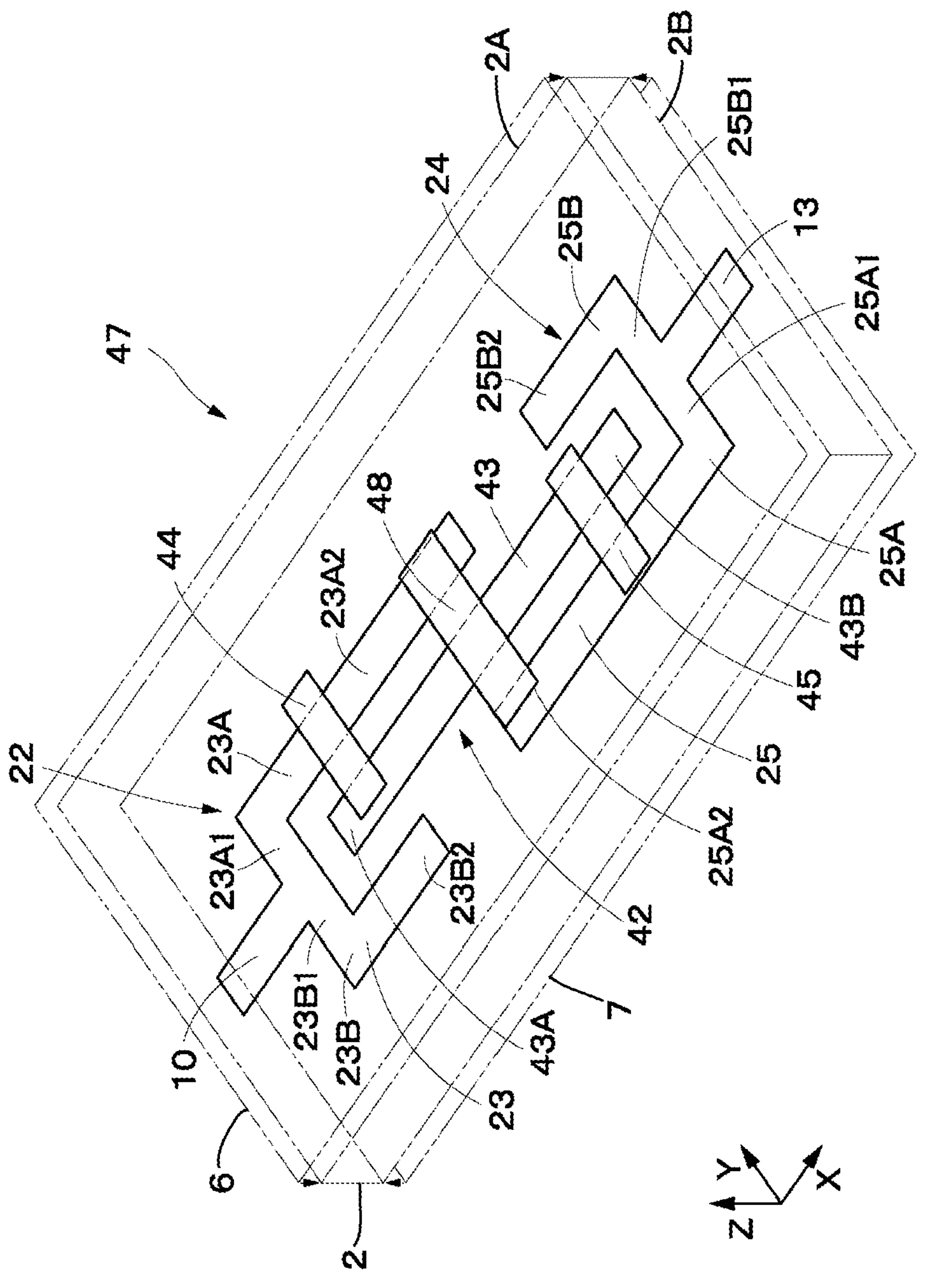
FIG. 17 is a perspective view illustrating a filter according to a second modification.

Note that, in the fourth embodiment, the floating electrode 46 is disposed between the second end part of the open end portion 23A2 and the second end part of the open end portion 25A2. The present disclosure is not limited thereto, and as in a filter 47 according to a second modification illustrated in FIG. 17, a floating electrode 48 may be formed to have a length dimension in the Y-axis direction larger than that of the floating electrode 46. In this case, the floating electrode 48 has a portion overlapping the open end portion 23A2, and has a portion overlapping the open end portion 25A2. Strength of cross-coupling between the resonators 22 and 24 can be adjusted, according to an areas where the floating electrode 48, and the open end portions 23A2 and 25A2 overlap.

Figure 18:
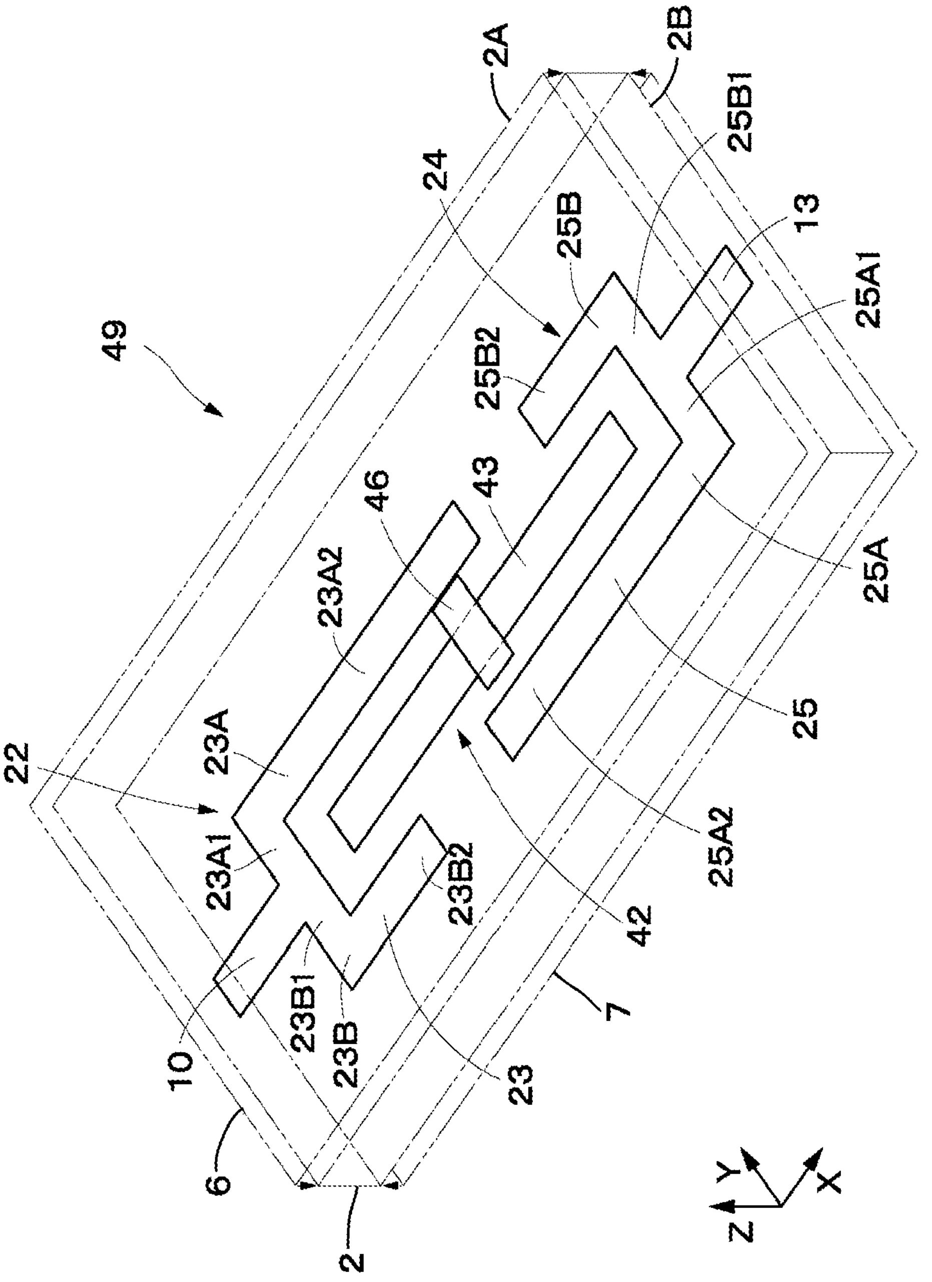
FIG. 18 is a perspective view illustrating a filter according to a third modification.

Note that, the open end portion 23A2 of the linear conductor 23 and the linear conductor 43 extend parallel to each other in the X-axis direction with a gap interposed therebetween. Thus, by appropriately setting the shapes and the like of the linear conductors 23 and 43, respectively, the linear conductors 23 and 43 can be coupled without necessarily the floating electrode 44. Similarly, by appropriately setting the shapes and the like of the linear conductors 25 and 43, respectively, the linear conductors 25 and 43 can be coupled without necessarily the floating electrode 45. In this case, the floating electrodes 44 and 45 may be omitted as in a filter 49 according to a third modification illustrated in FIG. 18.

Next, a fifth embodiment of the present disclosure will be described with reference to FIG. 19 to FIG. 21. The fifth embodiment is characterized in that a resonator is a stepped impedance resonator. The stepped impedance resonator is, for example, a resonator obtained by changing a line width of a linear conductor in a staircase pattern to change impedance midway of the linear conductor, in a half-wavelength resonator. Note that, in the fifth embodiment, the same components as those in the first embodiment are denoted by the same reference numerals, and the description thereof will be omitted.

A filter 51 according to the fifth embodiment includes the multilayer substrate 2, the ground electrodes 6, 7, resonators 52, 54, 56, the transmission lines 10, 13, the floating electrodes 16, 17, floating electrodes 58, and 59, similarly to the filter 1 according to the first embodiment.

Figure 19:
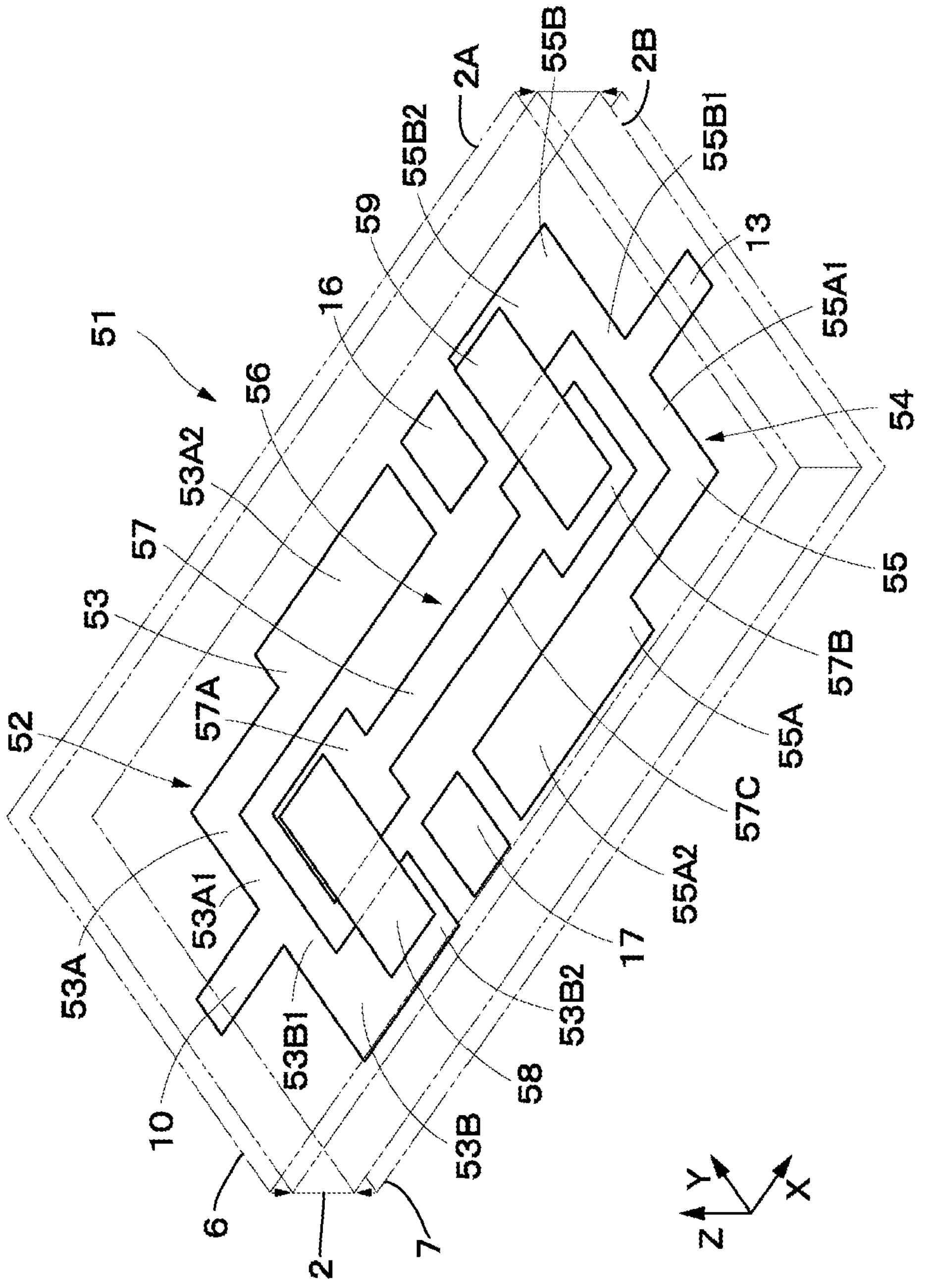
FIG. 19 is a perspective view illustrating a filter according to a fifth embodiment of the present disclosure.
Figure 20:
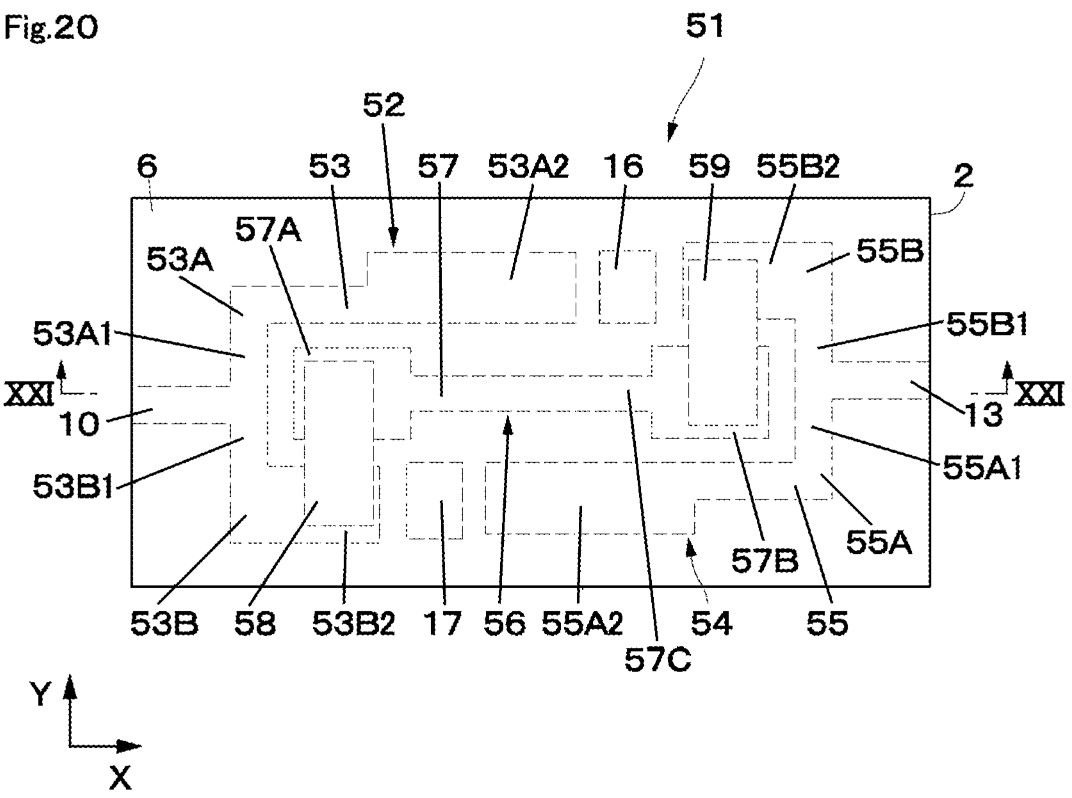
FIG. 20 is a plan view illustrating the filter in FIG. 19.
Figure 21:
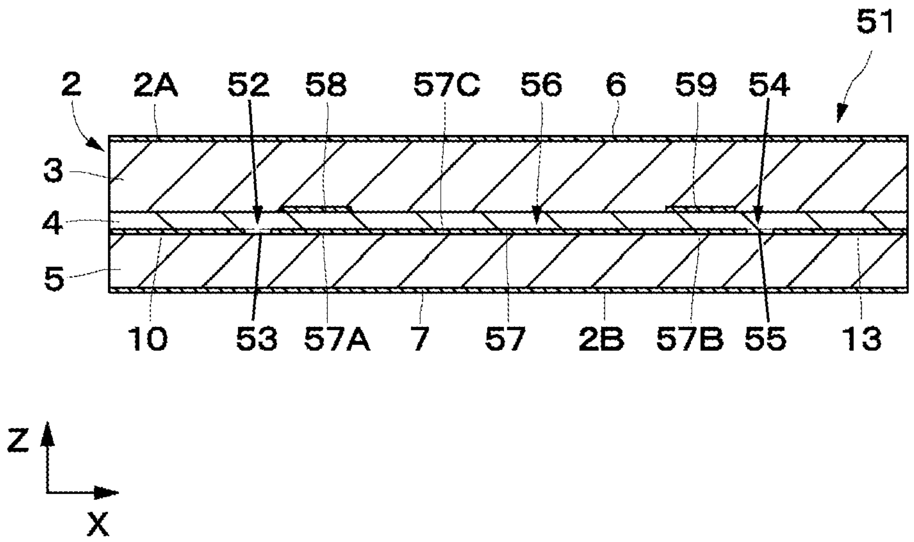
FIG. 21 is a cross-sectional view of the filter as viewed in a direction XXI-XXI indicated by arrows in FIG. 20.

The resonator 52 at an input stage is provided inside the multilayer substrate 2 (see FIG. 19 to FIG. 21). The resonator 52 is formed by a linear conductor 53 having a C shape in a plan view. As illustrated in FIG. 21, the linear conductor 53 is positioned between the insulating layer 4 and the insulating layer 5, and is formed by an elongated strip-shaped conductor pattern. A length dimension of the linear conductor 53 is set to, for example, ½ of a wave length in the multilayer substrate 2 corresponding to a resonant frequency. Both ends of the linear conductor 53 are open. Thus, the linear conductor 53 constitutes a half wave length resonator whose both the ends are open. The linear conductor 53 has a portion with a large width dimension and a portion with a small width dimension. Thus, the resonator 52 is a stepped impedance resonator having portions different in characteristic impedance.

As illustrated in FIG. 19 and FIG. 20, the linear conductor 53 includes a first open portion 53A and a second open portion 53B. The first open portion 53A of the linear conductor 53 is formed in an L shape in a plan view. The first open portion 53A has a connecting portion 53A1 and an open end portion 53A2. The connecting portion 53A1 of the first open portion 53A has a width dimension smaller than that of a second end of the open end portion 53A2. The connecting portion 53A1 of the first open portion 53A is aligned with a connecting portion 53B1 of the second open portion 53B, and extends in the Y-axis direction. A first end of the connecting portion 53A1 is electrically connected to the connecting portion 53B1. A second end of the connecting portion 53A1 is electrically connected to a first end of the open end portion 53A2.

The open end portion 53A2 of the first open portion 53A is one end portion (edge end portion) of the linear conductor 53, and extends in the X-axis direction. A first end part of the open end portion 53A2 has a width dimension smaller than that of a second end part of the open end portion 53A2. Thus, the width dimension of the open end portion 53A2 changes in steps at an intermediate position in the X-axis direction. A second end of the open end portion 53A2 is electrically open.

A length dimension of the first open portion 53A is larger than half a length dimension of the linear conductor 53. Thus, the length dimension of the first open portion 53A is larger than a length dimension of the second open portion 53B. The first open portion 53A of the linear conductor 53 is a quarter-wave open stub.

The second open portion 53B of the linear conductor 53 is formed in an L shape in a plan view. The second open portion 53B has the connecting portion 53B1 and an open end portion 53B2. The connecting portion 53B1 of the second open portion 53B has a width dimension smaller than that of the open end portion 53B2. The connecting portion 53B1 of the second open portion 53B is aligned with the connecting portion 53A1 of the first open portion 53A, and extends in the Y-axis direction. A first end of the connecting portion 53B1 is electrically connected to the connecting portion 53A1. A second end of the connecting portion 53B1 is electrically connected to a first end of the open end portion 53B2.

The open end portion 53B2 of the second open portion 53B is another end portion (edge end portion) of the linear conductor 53, and extends in the X-axis direction. A width dimension of the open end portion 53B2 is larger than that of the connecting portion 53B1. A second end of the open end portion 53B2 is electrically open.

The transmission line 10 on an input side is electrically connected to an intermediate position of the linear conductor 53. To be more specific, the transmission line 10 is connected to the linear conductor 53 at a connecting position between the first open portion 53A and the second open portion 53B. The resonator 52 at the input stage is directly coupled to the transmission line 10 on the input side provided in the multilayer substrate 2.

The resonator 54 at an output stage is provided inside the multilayer substrate 2 (see FIG. 19 to FIG. 21). The resonator 54 is formed by a linear conductor 55 having a C shape in a plan view. As illustrated in FIG. 21, the linear conductor 55 is positioned between the insulating layer 4 and the insulating layer 5, and is formed by an elongated strip-shaped conductor pattern. A length dimension of the linear conductor 55 is set to, for example, ½ of a wave length in the multilayer substrate 2 corresponding to a resonant frequency. Both ends of the linear conductor 55 are open. Thus, the linear conductor 55 constitutes a half wave length resonator whose both the ends are open. The linear conductor 55 has a portion with a large width dimension and a portion with a small width dimension. Thus, the resonator 54 is a stepped impedance resonator having portions different in characteristic impedance.

As illustrated in FIG. 19 and FIG. 20, the linear conductor 55 is spaced apart from the linear conductor 53 in the X-axis direction. The resonator 56 at an intermediate stage is disposed between the linear conductor 55 and the linear conductor 53. The linear conductor 55 is formed in a point-symmetric shape with the linear conductor 53 when the multilayer substrate 2 is viewed in a plan view. The linear conductor 55 includes a first open portion 55A and a second open portion 55B.

The first open portion 55A of the linear conductor 55 is formed in an L shape in a plan view. The first open portion 55A has a connecting portion 55A1 and an open end portion 55A2. The connecting portion 55A1 of the first open portion 55A has a width dimension smaller than that of a second end of the open end portion 55A2. The connecting portion 55A1 of the first open portion 55A is aligned with a connecting portion 55B1 of the second open portion 55B, and extends in the Y-axis direction. A first end of the connecting portion 55A1 is electrically connected to the connecting portion 55B1. A second end of the connecting portion 55A1 is electrically connected to a first end of the open end portion 55A2.

The open end portion 55A2 of the first open portion 55A is one end portion (edge end portion) of the linear conductor 55. The open end portion 55A2 of the first open portion 55A of the linear conductor 55 is aligned with the open end portion 53B2 of the second open portion 53B of the linear conductor 53, and extends in the X-axis direction. The open end portion 55A2 of the first open portion 55A of the linear conductor 55 is spaced apart from the open end portion 53B2 of the second open portion 53B of the linear conductor 53 in the X-axis direction. A first end part of the open end portion 55A2 has a width dimension smaller than that of a second end part of the open end portion 55A2. Thus, the width dimension of the open end portion 55A2 changes in steps at an intermediate position in the X-axis direction. A second end of the open end portion 55A2 is electrically open.

A length dimension of the first open portion 55A is larger than half a length dimension of the linear conductor 55. Thus, the length dimension of the first open portion 55A is larger than a length dimension of the second open portion 55B. The first open portion 55A of the linear conductor 55 is a quarter-wave open stub.

The second open portion 55B of the linear conductor 55 is formed in an L shape in a plan view. The second open portion 55B has the connecting portion 55B1 and an open end portion 55B2. The connecting portion 55B1 of the second open portion 55B has a width dimension smaller than that of the open end portion 55B2. The connecting portion 55B1 of the second open portion 55B is aligned with the connecting portion 55A1 of the first open portion 55A, and extends in the Y-axis direction. A first end of the connecting portion 55B1 is electrically connected to the connecting portion 55A1. A second end of the connecting portion 55B1 is electrically connected to a first end of the open end portion 55B2.

The open end portion 55B2 of the second open portion 55B is another end portion (edge end portion) of the linear conductor 55. The open end portion 55B2 of the second open portion 55B of the linear conductor 55 is aligned with the open end portion 53A2 of the first open portion 53A of the linear conductor 53, and extends in the X-axis direction. A second end of the open end portion 55B2 is electrically open.

The transmission line 13 on an output side is electrically connected to an intermediate position of the linear conductor 55. To be more specific, the transmission line 13 is connected to the linear conductor 55 at a connecting position between the first open portion 55A and the second open portion 55B. The resonator 54 at the output stage is directly coupled to the transmission line 13 on the output side provided in the multilayer substrate 2.

The floating electrode 16 is a cross-coupling electrode for cross-coupling the resonator 52 at the input stage and the resonator 54 at the output stage. As illustrated in FIG. 19 and FIG. 20, the floating electrode 16 is disposed between the open end portion 53A2 of the linear conductor 53 and the open end portion 55B2 of the linear conductor 55. The floating electrode 16, the linear conductors 53, and 55 are disposed in the same layer of the multilayer substrate 2.

The floating electrode 17 is a cross-coupling electrode for cross-coupling the resonator 52 at the input stage and the resonator 54 at the output stage. As illustrated in FIG. 19 and FIG. 20, the floating electrode 17 is disposed between the open end portion 53B2 of the linear conductor 53 and the open end portion 55A2 of the linear conductor 55. The floating electrode 17, the linear conductors 53, and 55 are disposed in the same layer of the multilayer substrate 2.

The resonator 56 at the intermediate stage is positioned between the resonator 52 at the input stage and the resonator 54 at the output stage, and is provided in the multilayer substrate 2. The resonator 56 is provided inside the multilayer substrate 2 (see FIG. 19 to FIG. 21). The resonator 56 is formed by a linear conductor 57 that is linear. As illustrated in FIG. 21, the linear conductor 57 is positioned between the insulating layer 4 and the insulating layer 5, and is formed by an elongated strip-shaped conductor pattern. Thus, the three resonators 52, 54, and 56 are disposed in the same layer of the multilayer substrate 2. A length dimension of the linear conductor 57 is set to, for example, ½ of a wave length in the multilayer substrate 2 corresponding to a resonant frequency. A first end portion 57A and a second end portion 57B positioned at both ends of the linear conductor 57, respectively, are open. Thus, the linear conductor 57 constitutes a half wave length resonator whose both the ends are open.

As illustrated in FIG. 19 and FIG. 20, an intermediate portion 57C is formed between the first end portion 57A and the second end portion 57B. A width dimension of each of the first end portion 57A and the second end portion 57B is larger than a width dimension of the intermediate portion 57C. Thus, the width dimension of the linear conductor 57 changes in steps at an intermediate position in the X-axis direction. Thus, the resonator 56 is a stepped impedance resonator having portions different in characteristic impedance.

The floating electrode 58 is positioned in a layer different from that of the linear conductors 53, 55, and 57, and is provided in the multilayer substrate 2. As illustrated in FIG. 21, the floating electrode 58 is positioned between the insulating layer 3 and the insulating layer 4, and is formed in a band shape extending in the Y-axis direction. Thus, the insulating layer 4 is sandwiched between the floating electrode 58, and the linear conductors 53 and 57. As illustrated in FIG. 19 and FIG. 20, the floating electrode 58 is disposed at a position facing the open end portion 53B2 of the linear conductor 53 and the first end portion 57A of the linear conductor 57. The floating electrode 58 extends in the Y-axis direction, crosses the linear conductor 57, and crosses the open end portion 53B2 of the second open portion 53B. As illustrated in FIG. 19 and FIG. 21, the floating electrode 58, and the linear conductors 53 and 57 are spaced apart from each other in the Z-axis direction. Thus, the first end portion 57A of the linear conductor 57 is capacitively coupled to the open end portion 53B2 of the linear conductor 53.

The floating electrode 59 is positioned in a layer different from that of the linear conductors 53, 55, and 57, and is provided in the multilayer substrate 2. As illustrated in FIG. 21, the floating electrode 59 is positioned between the insulating layer 3 and the insulating layer 4, and is formed in a band shape extending in the Y-axis direction. Thus, the insulating layer 4 is sandwiched between the floating electrode 59, and the linear conductors 55 and 57. As illustrated in FIG. 19 and FIG. 20, the floating electrode 59 is disposed at a position facing the open end portion 55B2 of the linear conductor 55 and the second end portion 57B of the linear conductor 57. The floating electrode 59 extends in the Y-axis direction, crosses the linear conductor 57, and crosses the open end portion 55B2 of the second open portion 55B. As illustrated in FIG. 19 and FIG. 21, the floating electrode 59, and the linear conductors 55 and 57 are spaced apart from each other in the Z-axis direction. Thus, the second end portion 57B of the linear conductor 57 is capacitively coupled to the open end portion 55B2 of the linear conductor 55.

Figure 22:
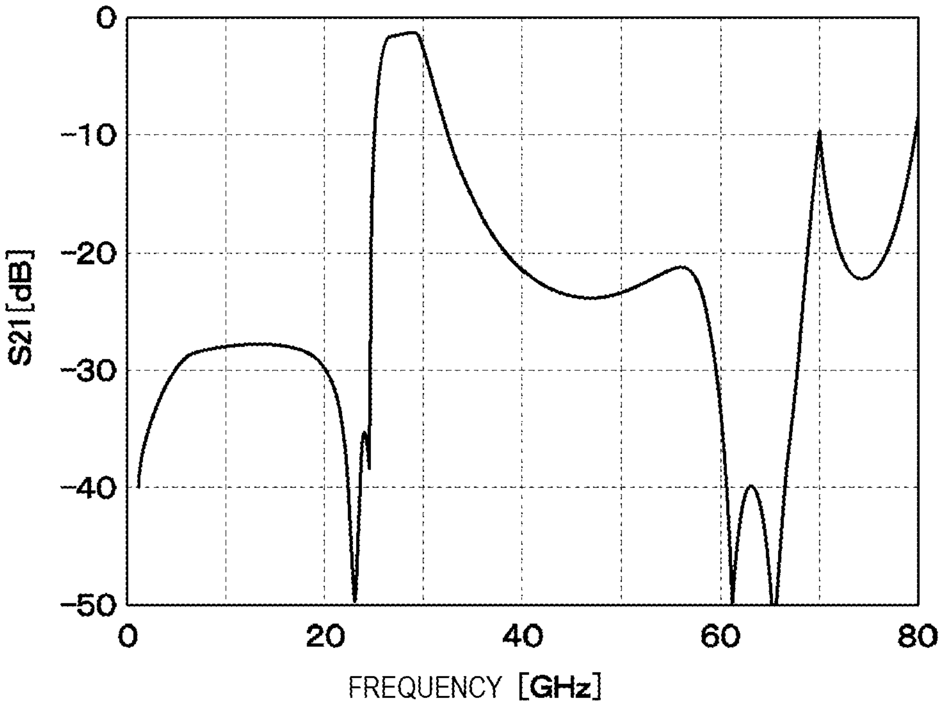
FIG. 22 is a characteristic diagram showing frequency characteristics of a transmission coefficient for the filter according to the fifth embodiment.

Thus, also in the fifth embodiment configured as described above, almost as in the first embodiment described above, with the filter 51, a plurality of attenuation poles can be formed on a low-frequency side of a pass band, and desired attenuation can be obtained without necessarily complicating the respective shapes of the resonators 52, 54, and 56. Further, since the resonators 52, 54, and 56 are the stepped impedance resonators, higher-order mode resonance can be controlled. As a result, as illustrated in FIG. 22, for example, it is possible to increase attenuation in a vicinity of a high-order resonant frequency (60 GHz) that is twice as high as a vicinity of 30 GHz, which is a fundamental resonant frequency of the resonators 52, 54, and 56. Accordingly, with the filter 51, broadband attenuation characteristics can be obtained.

Note that, in the fifth embodiment, as in the filter 1 according to the first embodiment, a plurality of attenuation poles are formed on the low-frequency side of the pass band. The present disclosure is not limited thereto, and a plurality of attenuation poles may be formed on a high-frequency side of the pass band in the same manner as the filter 21 according to the second embodiment.

Figure 23:
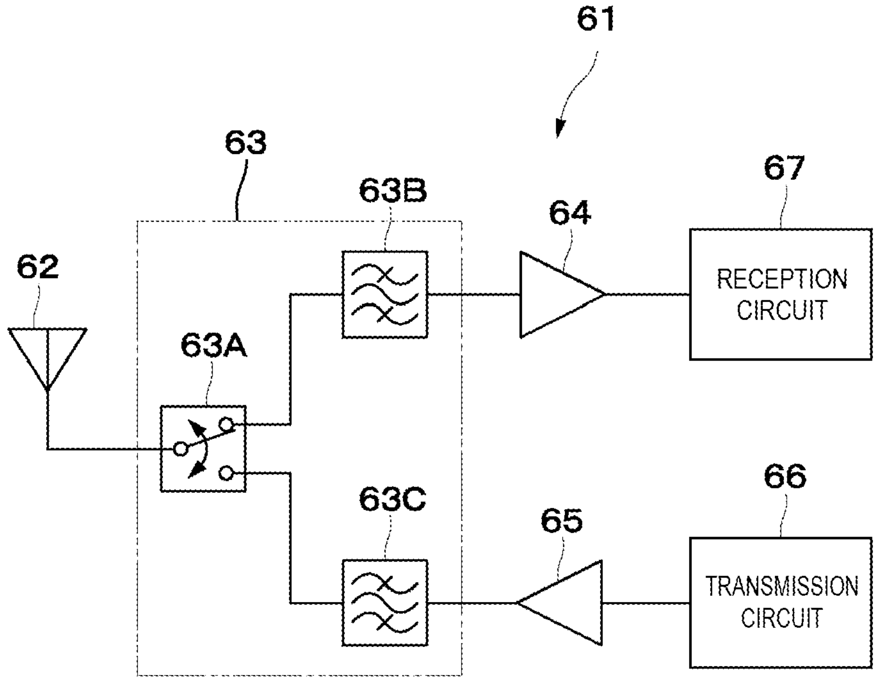
FIG. 23 is a block diagram illustrating a communication device according to a sixth embodiment of the present disclosure.

Next, a sixth embodiment of the present disclosure will be described with reference to FIG. 23. The sixth embodiment is characterized in that a communication device is constituted using a filter. Note that, in the sixth embodiment, the same components as those in the first embodiment are denoted by the same reference numerals, and the description thereof will be omitted.

A communication device 61 according to the sixth embodiment includes an antenna 62, an antenna duplexer 63, a low-noise amplifier 64, a power amplifier 65, a transmission circuit 66, and a reception circuit 67. The transmission circuit 66 is connected to the antenna 62 with the power amplifier 65 and the antenna duplexer 63 interposed therebetween. The reception circuit 67 is connected to the antenna 62 with the low-noise amplifier 64 and the antenna duplexer 63 interposed therebetween.

The antenna duplexer 63 includes a changeover switch 63A, and two band pass filters 63B and 63C. The changeover switch 63A selectively connects one of the transmission circuit 66 and the reception circuit 67 to the antenna 62. The changeover switch 63A selectively switches a transmission state and a reception state of the communication device 61. The band pass filter 63B on a reception side is connected between the changeover switch 63A and the low-noise amplifier 64. The band pass filter 63C on a transmission side is connected between the changeover switch 63A and the power amplifier 65. The band pass filters 63B and 63C are each constituted by, for example, the filter 1 according to the first embodiment. Note that, the band pass filters 63B and 63C may each be constituted by the filter 21, 31, 41, or 51 according to the second to fifth embodiments.

Thus, in the sixth embodiment configured as described above, the filters 63B and 63C are each constituted by, for example, any of the filters 1, 21, 31, 41, and 51 according to the first to fifth embodiments. Thus, with the filters 63B and 63C, a plurality of attenuation poles can be formed on a low-frequency side or a high-frequency side of a pass band, and desired attenuation can be obtained.

Next, a seventh embodiment of the present disclosure will be described with reference to FIG. 24 and FIG. 25. The seventh embodiment is characterized in that an antenna module is constituted using a filter. Note that, in the seventh embodiment, the same components as those in the first embodiment are denoted by the same reference numerals, and the description thereof will be omitted.

Figure 24:
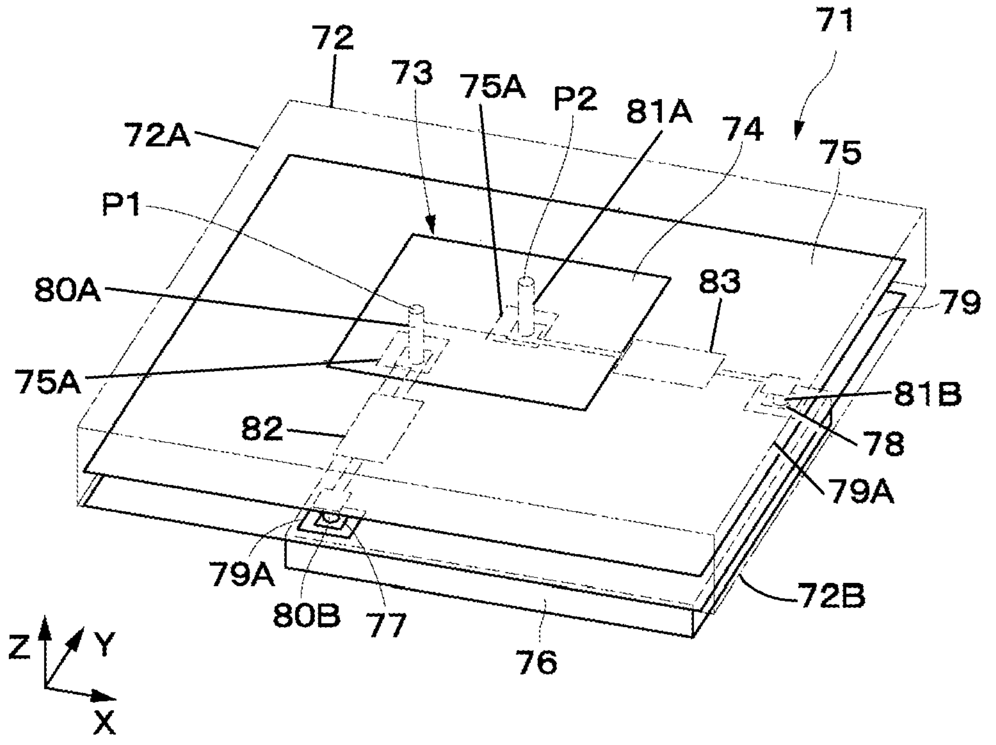
FIG. 24 is a perspective view illustrating an antenna module according to a seventh embodiment of the present disclosure.

FIG. 24 is a perspective view of an antenna module 71 according to the seventh embodiment. The antenna module 71 is used for communication using millimeter waves, such as 28 GHz, 39 GHz, and 60 GHz, for example. Descriptions will be given, with a thickness direction of the antenna module 71 as the Z-axis direction, directions orthogonal to the Z-axis direction and orthogonal to each other as the X-axis direction and the Y-axis direction, respectively, and descriptions will be given, with a plus side of the Z-axis as an upper surface side of the antenna module 71. However, in an actual use mode, the thickness direction of the antenna module 71 is not a vertical direction in some cases, and thus the upper surface side of the antenna module 71 is not limited to an upward direction.

The antenna module 71 illustrated in FIG. 24 can support two types of polarized waves in both at transmission and at reception, and is used for full-duplex communication, for example. In the present embodiment, the antenna module 71 supports a polarized wave in the X-axis direction and a polarized wave in the Y-axis direction as the two types of polarized waves. That is, the antenna module 71 according to the present embodiment supports the two polarized waves orthogonal to each other. Note that, the antenna module 71 is not limited thereto, and may support two polarized waves forming an angle different from a right angle (for example, 75° or 60°).

The antenna module 71 includes a multilayer substrate 72, a patch antenna 73 formed on the multilayer substrate 72, a first filter 82, a second filter 83, and a high-frequency circuit (RFIC) 76.

The multilayer substrate 72 has a first main surface 72A and a second main surface 72B whose respective back sides face each other. The first main surface 72A is a main surface on the plus side of the Z-axis of the multilayer substrate 72, and the second main surface 72B is a main surface on a minus side of the Z-axis of the multilayer substrate 72. The multilayer substrate 72 has structure in which a dielectric material is filled between the first main surface 72A and the second main surface 72B. In FIG. 24 and FIG. 25, the dielectric material is made transparent to visualize an inside of the multilayer substrate 72, and an outer shape of the multilayer substrate 72 is indicated by a two-dot chain line. As the multilayer substrate 72, a low temperature co-fired ceramic multilayer substrate, a printed circuit board, or the like is used. Additionally, as various conductors formed on the multilayer substrate 72, a metal containing aluminum, copper, gold, silver, or an alloy thereof as a main component is used.

Figure 25:
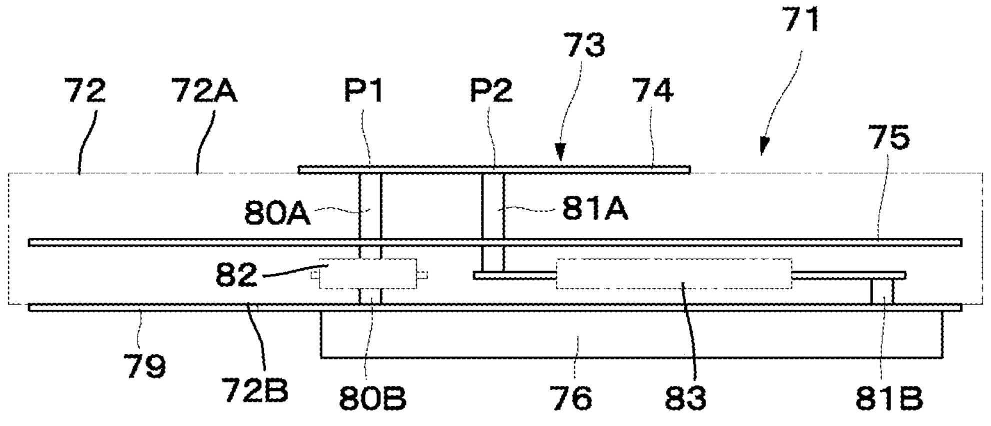
FIG. 25 is a side view illustrating the antenna module in FIG. 24.

As illustrated in FIG. 24 and FIG. 25, the patch antenna 73 is constituted by a radiation electrode 74 formed on a side of the first main surface of the multilayer substrate 72, and formed of a thin-film conductor pattern provided in parallel with the main surface of the multilayer substrate 72, and a ground electrode 75. For example, the radiation electrode 74 as an antenna element is provided on the first main surface 72A. Inside the multilayer substrate 72, the ground electrode 75 is formed at a position closer to the second main surface than the radiation electrode 74. The radiation electrode 74 has, for example, a rectangular shape in a plan view of the multilayer substrate 72, but may have a circular shape, a polygonal shape, or the like. The ground electrode 75 is set to ground potential, and functions as a ground conductor of the radiation electrode 74. Further, the radiation electrode 74 may be formed in an inner layer of the multilayer substrate 72 to prevent oxidation or the like, or a protective film may be formed on the radiation electrode 74. Further, the radiation electrode 74 may be constituted by a feed conductor and a parasitic conductor disposed above the feed conductor.

The RFIC 76 is formed on a side of the second main surface of the multilayer substrate 72, and constitutes an RF-signal processing circuit that signal-processes a transmission signal transmitted or a reception signal received by the patch antenna 73. The RFIC 76 has feed terminals 77 and 78 connected to the patch antenna 73. Further, a ground electrode 79 is formed on the side of the second main surface of the multilayer substrate 72, and, for example, a ground terminal (not illustrated) of the RFIC 76 is connected to the ground electrode 79. Note that, in the present embodiment, the RFIC 76 is provided on the second main surface 72B of the multilayer substrate 72, but may be built in the multilayer substrate 72.

The patch antenna 73 has a first feed point P1 and a second feed point P2 through which high-frequency signals are transmitted to and from the RFIC 76. The first feed point P1 and the second feed point P2 are provided at different positions in the radiation electrode 74, respectively. A direction of a polarized wave formed by the first feed point P1 and a direction of a polarized wave formed by the second feed point P2 are different from each other. For example, a polarized wave in the X-axis direction is formed by the first feed point P1, and a polarized wave in the Y-axis direction is formed by the second feed point P2. Thus, one patch antenna 73 can support the two polarized waves.

The first feed point P1 is electrically connected to the RFIC 76 via the first filter 82. The second feed point P2 is electrically connected to the RFIC 76 via the second filter 83. As illustrated in FIG. 24, the first feed point P1 is connected to the feed terminal 77 included in the RFIC 76 with a via conductor 80A, the first filter 82, and a via conductor 80B interposed therebetween. The second feed point P2 is connected to the feed terminal 78 included in the RFIC 76 with a via conductor 81A, a second filter 83, and a via conductor 81B interposed therebetween.

When the multilayer substrate 72 is viewed in a laminating direction (when the multilayer substrate 72 is viewed in a plan view), the ground electrode 75 is provided substantially over an entirety of the multilayer substrate 72, except for portions where the via conductors 80A and 81A are provided, respectively, for example. As illustrated in FIG. 24, the ground electrode 75 has openings 75A inside which the via conductors 80A and 81A pass, respectively. Further, when the multilayer substrate 72 is viewed in the laminating direction, the ground electrode 79 is provided substantially over the entirety of the multilayer substrate 72, except for portions where the via conductors 80B and 81B are provided, respectively, for example. The ground electrode 79 has openings 79A inside which the via conductors 80B and 81B pass, respectively.

The first filter 82 and the second filter 83 are each constituted by, for example, the filter 1 according to the first embodiment. Note that, the first filter 82 and the second filter 83 may each be constituted by the filter 21, 31, 41, or 51 according to the second to fifth embodiments. The first filter 82 and the second filter 83 are different filters that are not integrally formed, but separately formed. As illustrated in FIG. 25, the radiation electrode 74 (antenna element), the first filter 82, the second filter 83, and the RFIC 76 are sequentially laminated from the first main surface 72A of the multilayer substrate 72. The first filter 82 and the second filter 83 are provided midway of respective paths that electrically connect the radiation electrode 74 and the RFIC 76.

Respective pass bands of the first filter 82 and the second filter 83 at least partially overlap each other. For example, the first filter 82 and the second filter 83 have substantially the same filter characteristics. Specifically, the respective pass bands of the first filter 82 and the second filter 83 are substantially the same as each other, and respective attenuation bands of the first filter 82 and the second filter 83 are substantially the same as each other. For example, since high-frequency signals having the same frequency band are fed to the first feed point P1 and the second feed point P2, respectively, the same filtering process is performed on the respective high-frequency signals.

The first filter 82 and the second filter 83 provided between the patch antenna 73 and the RFIC 76 have a function of passing a high-frequency signal in a frequency band used by the patch antenna 73, and attenuating a high-frequency signal (unwanted wave) in other frequency bands. Thus, it is possible to attenuate a harmonic wave such that the harmonic wave is not outputted from the patch antenna 73 as an unwanted wave. In addition, it is possible to attenuate an interference wave such that the interference wave received by the patch antenna 73 as an unwanted wave is not inputted to a low-noise amplifier (LNA) included in the RFIC 76 to saturate the LNA. In this way, it is possible to attenuate unwanted waves that can be transmitted and received in the same manner for each of the two feed points. Thus, the antenna module 71 can be applied to a MIMO system, which is a system that signal-processes signals passing through a plurality of signal paths in the same manner.

Thus, in the seventh embodiment configured as described above, the first filter 82 and the second filter 83 are each configured by, for example, any of the filters 1, 21, 31, 41, and 51 according to the first to fifth embodiments. Accordingly, with the first filter 82 and the second filter 83, desired attenuation can be obtained, without necessarily complicating a shape of a resonator. Accordingly, for example, even when attenuation changes due to a design change such as a layout change, the attenuation can be easily adjusted. As a result, for example, even when the radiation electrode 74, and the first filter 82 and the second filter 83 are formed on different substrates, respectively, and the radiation electrode 74, and the first filter 82 and the second filter 83 are connected to each other by bonding or soldering, desired attenuation can be secured. Note that, either one of the ground electrodes 75 and 79 may be omitted, or both may be omitted.

Next, an eighth embodiment of the present disclosure will be described with reference to FIG. 26 and FIG. 27. The eighth embodiment is characterized in that an antenna module is constituted using a filter, and a transmission line on each of an input side and an output side of the filter is electrically connected to an external terminal of a high-frequency circuit. Note that, in the eighth embodiment, the same components as those in the first embodiment are denoted by the same reference numerals, and the description thereof will be omitted.

Figure 26:
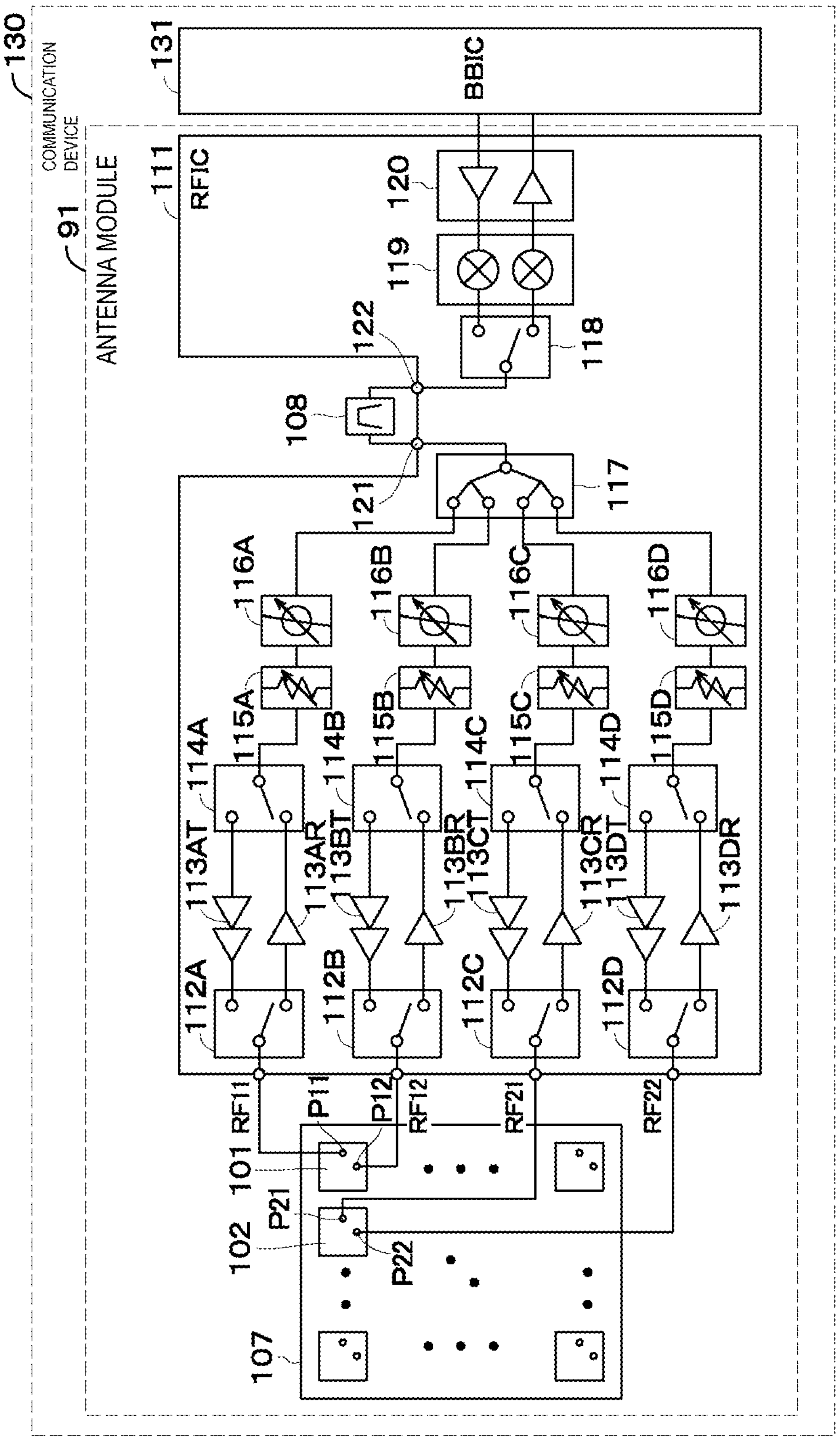
FIG. 26 is a block diagram illustrating a communication device according to an eighth embodiment of the present disclosure.

FIG. 26 is a block diagram illustrating an example of a communication device 130 to which an antenna module 91 according to the present embodiment is applied. The communication device 130 is, for example, a mobile terminal, such as a mobile phone, a smart phone, or a tablet, or a personal computer having a communication function, or the like.

The communication device 130 includes an antenna module 91, and a baseband IC 131 (hereinafter referred to as a BBIC 131) constituting a baseband signal processing circuit. The antenna module 91 includes an array antenna 107 and an RFIC 111, which is an example of a feed circuit. The communication device 130 up-converts a signal transmitted from the BBIC 131 to the antenna module 91 into a high-frequency signal, radiates the high-frequency signal to the array antenna 107, downloads a high-frequency signal received by the array antenna 107, and processes the signal in the BBIC 131.

Figure 27:
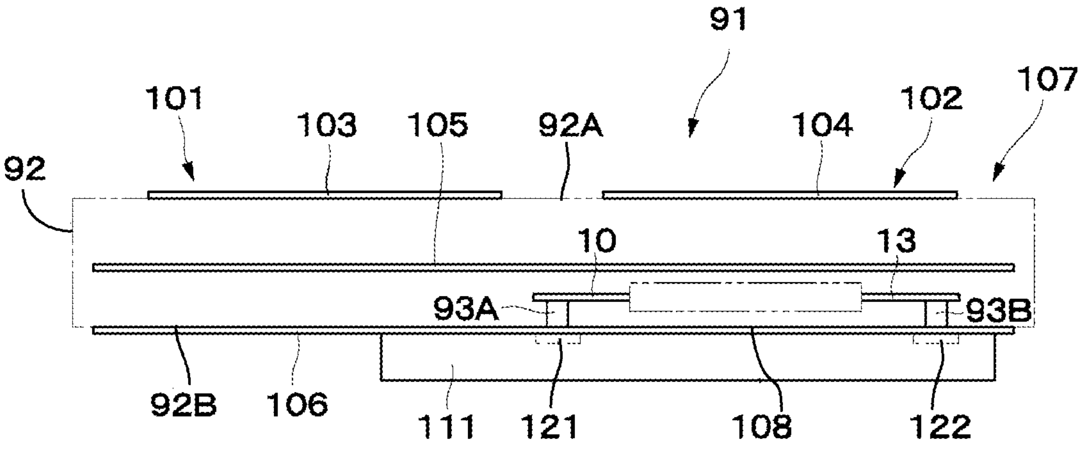
FIG. 27 is a side view illustrating an antenna module in FIG. 26.

FIG. 27 is a side perspective view of the antenna module 91 according to the eighth embodiment. In FIG. 27, a dielectric material is made transparent to visualize an inside of a multilayer substrate 92, and an outer shape of the multilayer substrate 92 is indicated by a two-dot chain line.

FIG. 27 illustrates a part of the multilayer substrate 92, and actually, the antenna module 91 includes many patch antennas other than two patch antennas 101 and 102, and is applicable to a massive MIMO system.

The patch antennas 101 and 102 are formed on a first main surface side of the multilayer substrate 92. The patch antenna 101 is constituted by a radiation electrode 103 (antenna element) formed of a thin-film conductor pattern formed on a first main surface 92A of the multilayer substrate 92, and a ground electrode 105 formed inside the multilayer substrate 92. The patch antenna 102 is constituted by a radiation electrode 104 (antenna element) formed of a thin-film conductor pattern formed on the first main surface 92A of the multilayer substrate 92, and the ground electrode 105 formed inside the multilayer substrate 922. A ground electrode 106 is formed on a second main surface 92B of the multilayer substrate 92. The ground electrodes 105 and 106 are provided substantially over an entirety of the multilayer substrate 92.

Inside the multilayer substrate 92, a filter 108 is provided between the ground electrodes 105 and 106. The filter 108 is provided outside the RFIC 111. The filter 108 is constituted by, for example, the filter 1 according to the first embodiment. Note that, the filter 108 may be constituted by the filter 21, 31, 41, or 51 according to the second to fifth embodiments. Further, the filter 108 may be provided between the patch antennas 101 and 102, and switches 112A to 112D.

The radiation electrodes 103, 104 (antenna elements), the filter 108, and the RFIC 111 are sequentially laminated from the first main surface 92A of the multilayer substrate 92. The transmission line 10 on an input side of the filter 108 is electrically connected to an external terminal 121 of the RFIC 111 (high-frequency circuit). The transmission line 13 on an output side of the filter 108 is electrically connected to an external terminal 122 of the RFIC 111 (high-frequency circuit).

A plurality of the patch antennas 101 and 102 are periodically arrayed in a matrix to constitute the array antenna 107. The array antenna 107 is two-dimensionally and orthogonally disposed (that is, disposed in a matrix). Note that, it is sufficient that the number of patch antennas constituting the array antenna 107 is two or more. Further, a disposition aspect of the plurality of patch antennas is not limited to the above. For example, the array antenna 107 may be constituted by patch antennas disposed one dimensionally, or may be constituted by patch antennas disposed in a staggered manner.

Next, a specific configuration of the RFIC 111 (high-frequency circuit) will be described. Note that, in FIG. 26, for ease of explanation, only a configuration is illustrated corresponding to a first feed point P11 and a second feed point P12 of one patch antenna 101, and a first feed point P21 and a second feed point P22 of one patch antenna 102, among the plurality of patch antennas 101 and 102 constituting the array antenna 107, and a configuration corresponding to the other patch antennas is omitted.

As illustrated in FIG. 26, the RFIC 111 (high-frequency circuit) includes the switches 112A to 112D, switches 114A to 114D, and 118, power amplifiers 113AT to 113DT, low noise amplifiers 113AR to 113DR, attenuators 115A to 115D, variable phase shifters 116A to 116D, a signal synthesizer/demultiplexer 117, a mixer 119, and an amplifier circuit 120. The RFIC 111 is connected to the BBIC 131.

The switches 112A to 112D are connected to the first feed point P11 and the second feed point P12 of the patch antenna 101, and the first feed point P21 and the second feed point P22 of the patch antenna 102.

When high-frequency signals RF11, RF12, RF21, and RF22 are transmitted, the switches 112A to 112D, and 114A to 114D are switched to sides of the power amplifiers 113AT to 113DT, respectively, and the switch 118 is connected to a transmission side amplifier of the amplifier circuit 120. When the high-frequency signals RF11, RF12, RF21, and RF22 are received, the switches 112A to 112D, and 114A to 114D are switched to sides of the low noise amplifiers 113AR to 113DR, respectively, and the switch 118 is connected to a reception side amplifier of the amplifier circuit 120.

A signal transmitted from the BBIC 131 is amplified by the amplifier circuit 120 and is up-converted by the mixer 119. Transmission signals which are the up-converted high-frequency signals RF11, RF12, RF21, and RF22 are demultiplexed into four by the signal synthesizer/demultiplexer 117, pass through four signal paths, and are fed to the first feed point P11 and the second feed point P12 of the patch antenna 101 and the first feed point P21 and the second feed point P22 of the patch antenna 102, respectively.

Reception signals, which are the high-frequency signals RF11, RF12, RF21, and RF22 received by the patch antennas 101 and 102, pass through four different signal paths, respectively, and are synthesized by the signal synthesizer/demultiplexer 117. The synthesized reception signal is down-converted by the mixer 119, amplified by the amplifier circuit 120, and transmitted to the BBIC 131.

The RFIC 111 is formed, for example, as a one chip integrated circuit component including the above-described circuit configuration. Alternatively, devices (switches, power amplifiers, low noise amplifiers, attenuators, and variable phase shifters) corresponding to the feed points P11, P12, P21, and P22 in the RFIC 111 may be formed as one chip integrated circuit component for each of the corresponding feed points P11, P12, P21, and P22.

The RFIC 111 includes the external terminals 121 and 122. The external terminals 121 and 122 are provided between the signal synthesizer/demultiplexer 117 and the switch 118. The external terminals 121 is electrically connected to the transmission line 10 of the filter 108, through a via conductor 93A provided in the multilayer substrate 92, and the external terminal 122 is electrically connected to the transmission line 13 of the filter 108, through a via conductor 93B provided in the multilayer substrate 92. Thus, the filter 108 is connected between the signal synthesizer/demultiplexer 117 and the switch 118.

Thus, in the eighth embodiment configured as described above, the filter 108 is configured by, for example, any of the filters 1, 21, 31, 41, and 51 according to the first to fifth embodiments. Accordingly, with the filter 108, desired attenuation can be obtained, without necessarily complicating a shape of a resonator. Note that, either one of the ground electrodes 105 and 106 may be omitted, or both may be omitted.

In the first to fifth embodiments described above, the configuration has been adopted in which the ground electrodes 6 and 7 are provided on the two main surfaces of the multilayer substrate 2, respectively. The present disclosure is not limited thereto, and either one of the ground electrodes 6 and 7 may be omitted, or both may be omitted.

In the first embodiment described above, the linear conductors 9 and 12 are each formed in the C shape in a plan view. The C shape of each of the linear conductors 9 and 12 need not be a strict C shape. The C shape of each of the linear conductors 9 and 12 includes, for example, a shape in which a portion thereof is a straight portion or a curved portion. Further, a connection point between the C shaped linear conductor 9 and the transmission line 10 may be any point as long as the point is other than a midpoint of an entire length of the C shaped linear conductor 9. Similarly, a connection point between the C shaped linear conductor 12 and the transmission line 13 may be any point as long as the point is other than a midpoint of an entire length of the C shaped linear conductor 12. These configurations can also be applied to the second to fifth embodiments.

In the first embodiment described above, the plurality of resonators 8, 11, and 14 are formed in the rotationally symmetric shape. The present disclosure is not limited thereto, and a plurality of resonators may be formed in a line-symmetric (left-right symmetric) shape at an input side and an output side, for example. This configuration can also be applied to the second to fifth embodiments.

In the first embodiment described above, the case where the dielectric substrate is the multilayer substrate 2 has been exemplified. The present disclosure is not limited thereto, and the dielectric substrate may be a single-layer substrate made of an insulating material. This configuration can also be applied to the second to fifth embodiments.

Figure 28:
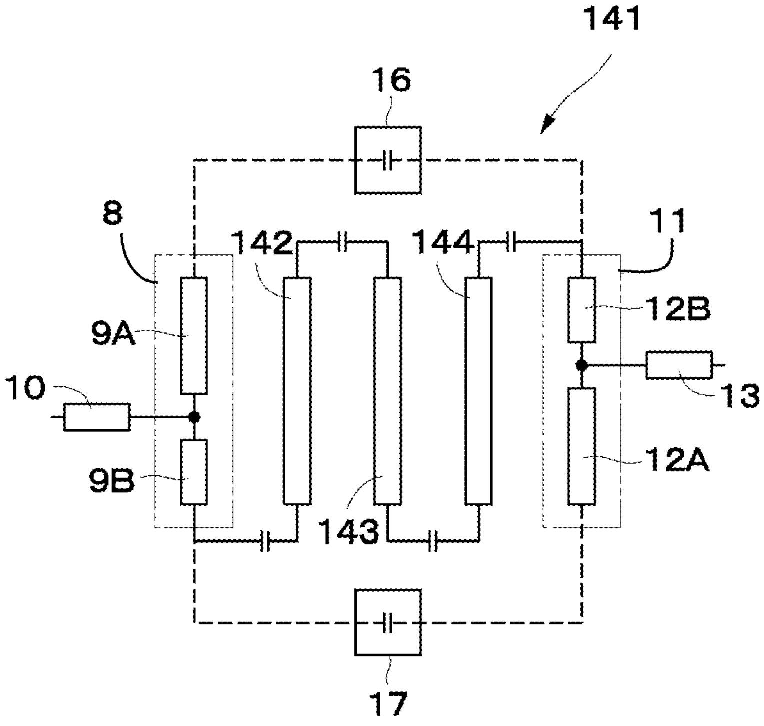
FIG. 28 is an equivalent circuit diagram illustrating a filter according to a fourth modification.

In the first embodiment described above, one resonator 14 at the intermediate stage is provided between the resonator 8 at the input stage and the resonator 11 at the output stage. The present disclosure is not limited thereto, and as in a filter 141 according to a fourth modification illustrated in FIG. 28, a configuration may be adopted in which resonators 142, 143, and 144 at a plurality of stages (for example, three stages) are provided between the resonator 8 at an input stage and the resonator 11 at an output stage. In this case, the resonator 8 at the input stage is coupled to the resonator 142 at a next stage. The resonator 142 is coupled to the resonator 143 at a next stage. The resonator 143 is coupled to the resonator 144 at a next stage. The resonator 144 is coupled to the resonator 11 at an output stage as a next stage. Note that, the number of stages of the resonators at the intermediate stage is not limited to three, and may be two, or four or more. The configuration of the fourth modification can also be applied to the second to fifth embodiments.

Each of the above-described embodiments is merely an exemplification, and it is needless to say that partial replacement or combination of the configurations illustrated in the different embodiments is possible.

As the filter, the antenna module, and the communication device based on the embodiments described above, for example, the following aspects can be considered.

As a first aspect, a filter includes a dielectric substrate, and resonators at least at three or more stages provided in the dielectric substrate, and coupled to a next stage. One of the resonators at an input stage is formed by a linear conductor having a C-shape in a plan view, and directly coupled to a transmission line on an input side provided in the dielectric substrate, one of the resonators at an output stage is formed by a linear conductor having a C-shape in a plan view, and directly coupled to a transmission line on an output side provided in the dielectric substrate, and the dielectric substrate is provided with a cross-coupling electrode for coupling an end portion of the linear conductor of the resonator at the input stage and an end portion of the linear conductor of the resonator at the output stage.

With this configuration, the resonators at the three or more stages coupled to the next stage constitute a band pass filter, and pass a signal in a band in a vicinity of a resonant frequency of the resonators at the three or more stages. Further, the resonator at the input stage has an open stub. The resonator at the output stage has an open stub. Thus, these open stubs form an attenuation pole on a low-frequency side or a high-frequency side of a pass band.

In addition to this, the cross-coupling electrode couples an end portion of the linear conductor of the resonator at the input stage and an end portion of the linear conductor of the resonator at the output stage. Thus, an additional attenuation pole can be formed, that is positioned in a vicinity of the attenuation pole of the open stubs. At this time, coupling strength between the linear conductor of the resonator at the input stage and the linear conductor of the resonator at the output stage can be easily changed, in accordance with a size, a shape, and a position of the cross-coupling electrode. As a result, desired attenuation can be obtained without necessarily complicating shapes of the respective resonators at the three or more stages.

A second aspect is characterized in that, in the first aspect, the dielectric substrate is a multilayer substrate, the linear conductor of the resonator at the input stage and the linear conductor of the resonator at the output stage are disposed in the same layer of the multilayer substrate, and the multilayer substrate is provided with one of the resonators at an intermediate stage positioned in a layer different from the layer in which the linear conductor of the resonator at the input stage and the linear conductor of the resonator at the output stage are disposed, and having a first end portion capacitively coupled to the resonator at the input stage, and a second end portion capacitively coupled to the resonator at the output stage. Thus, the resonators at the three or more stages can be coupled to form a band pass filter.

A third aspect is characterized in that, in the first aspect, the dielectric substrate is a multilayer substrate, linear conductors of the resonators at three or more stages are disposed in the same layer of the multilayer substrate, and the multilayer substrate is provided with a floating electrode positioned in a layer different from the layer in which the linear conductors of the resonators are disposed, and capacitively coupling two of the resonators adjacent to each other. Thus, the resonators at the three or more stages can be coupled to form a band pass filter.

A fourth aspect is characterized in that, in the third aspect, the cross-coupling electrode is another floating electrode positioned in a layer different from the layer in which the linear conductor of the resonator at the input stage and the linear conductor of the resonator at the output stage are disposed, and capacitively coupling the resonator at the input stage and the resonator at the output stage. Thus, an end portion of the linear conductor of the resonator at the input stage and an end portion of the linear conductor of the resonator at the output stage can be cross-coupled.

A fifth aspect is characterized in that, in the first or second aspect, ground electrodes are provided on two main surfaces of the dielectric substrate, and the resonators at three or more stages are provided inside the dielectric substrate. Thus, since the resonators at the three or more stages are sandwiched between the two ground electrodes, it is possible to suppress interference from external electromagnetic waves, and to suppress radiation of electromagnetic waves to the external.

A sixth aspect is characterized in that, in any one of the first to third aspects, the resonators at three or more stages are formed in a shape that is rotationally symmetric when the dielectric substrate is viewed in a plan view. Thus, the resonators at the three or more stages can be easily designed, and mass productivity of the filter can be improved.

A seventh aspect is characterized in that, in any one of the first to sixth aspects, the resonators are stepped impedance resonators. Thus, higher-order mode resonance can be controlled. Thus, since attenuation can be increased in a vicinity of a high-order resonant frequency, a broadband attenuation characteristic can be obtained.

An eighth aspect is characterized in that, in any one of the first to seventh aspects, the resonators at a plurality of stages are provided between the resonator at the input stage and the resonator at the output stage.

As a ninth aspect, an antenna module includes the filter according to any one of the first to eighth aspects. An antenna element, the filter, and a high-frequency circuit are sequentially laminated from one main surface of the dielectric substrate, and the filter is provided midway of a path that electrically connects the antenna element and the high-frequency circuit.

As a tenth aspect, an antenna module includes the filter according to any one of the first to eighth aspects. An antenna element, the filter, and a high-frequency circuit are sequentially laminated from one main surface of the dielectric substrate, and the transmission lines on the input side and the output side of the filter are electrically connected to external terminals of the high-frequency circuit.

According to the ninth and tenth aspects, by using the filter according to any one of the first to eighth aspects, it becomes easy to adjust attenuation caused by a design change such as a layout change. Thus, even when the antenna element and the filter are formed on different substrates, respectively, and the antenna element and the filter are connected to each other by bonding or soldering, desired attenuation can be ensured.

As an eleventh aspect, a communication device includes the filter according to any one of the first to eighth aspects.

REFERENCE SIGNS LIST

- 1, 21, 31, 36, 41, 47, 49, 51, 108, 141 FILTER
- 2, 72, 92 MULTILAYER SUBSTRATE (DIELECTRIC SUBSTRATE)
- 2A, 72A, 92A FIRST MAIN SURFACE
- 2B, 72B, 92B SECOND MAIN SURFACE
- 6, 7, 75, 79, 105, 106 GROUND ELECTRODE
- 8, 22, 52 RESONATOR AT INPUT STAGE
- 9, 12, 15, 23, 25, 27, 33, 43, 53, 55, 57 LINEAR CONDUCTOR
- 9A2, 9B2, 12A2, 12B2, 23A2, 23B2, 25A2, 25B2, 53A2, 53B2, 55A2, 55B2 OPEN END PORTION (END PORTION)
- 10 TRANSMISSION LINE ON INPUT SIDE
- 11, 24, 54 RESONATOR AT OUTPUT STAGE
- 13 TRANSMISSION LINE ON OUTPUT SIDE
- 14, 26, 32, 42, 56, 142, 143, 144 RESONATOR AT INTERMEDIATE STAGE
- 15B, 27B COUPLING PORTION (FIRST END PORTION)
- 15C, 27C COUPLING PORTION (SECOND END PORTION)
- 16, 17, 28, 46, 48 FLOATING ELECTRODE (CROSS-COUPLING ELECTRODE)
- 33A, 43A, 57A FIRST END PORTION
- 33B, 43B, 57B SECOND END PORTION
- 34, 35, 44, 45, 58, 59 FLOATING ELECTRODE
- 61, 130 COMMUNICATION DEVICE
- 63B, 63C BAND PASS FILTER (FILTER)
- 71, 91 ANTENNA MODULE
- 73, 101, 102 PATCH ANTENNA

74, 103, 104 RADIATION ELECTRODE (ANTENNA ELEMENT)
76, 111 RFIC (HIGH-FREQUENCY CIRCUIT)
82 FIRST FILTER (FILTER)
83 SECOND FILTER (FILTER)
121, 122 EXTERNAL TERMINAL

The invention claimed is:

1. A filter, comprising:
a dielectric substrate; and
at least three resonators at different stages, the resonators being in the dielectric substrate,
wherein a first of the at least three resonators is at an input stage, is formed by a first linear conductor having a C-shape in a plan view, and is directly coupled to a first transmission line, the first transmission line being in the dielectric substrate and being at an input side of the filter,
wherein a second of the at least three resonators is at an output stage, is formed by a second linear conductor having a C-shape in the plan view, and is directly coupled to a second transmission line, the second transmission line being in the dielectric substrate and being at an output side of the filter,
wherein the dielectric substrate comprises a cross-coupling electrode configured to couple an end portion of the first linear conductor and an end portion of the second linear conductor, wherein the dielectric substrate is a multilayer substrate,
wherein the first and second linear conductors, and a third linear conductor of a third of the at least three resonators, are in a same layer of the multilayer substrate, and
wherein the multilayer substrate comprises a floating electrode that is in a layer of the multilayer substrate that is different from the layer having the linear conductors of the resonators, and that capacitively couples two of the resonators adjacent to each other.

2. The filter according to claim 1, wherein the cross-coupling electrode is a second floating electrode that is in a layer of the multilayer substrate that is different from the layer having the first linear conductor and the second linear conductor, and capacitively couples the first resonator and the second resonator.

3. The filter according to claim 1, wherein the at least three resonators are formed in a shape that is rotationally symmetric when the dielectric substrate is viewed in the plan view.

4. The filter according to claim 1, wherein the at least three resonators are stepped impedance resonators.

5. The filter according to claim 1, comprising resonators at a plurality of stages that are between the first resonator and the second resonator.

* * * * *